United States Patent
Nakaoka

(10) Patent No.: US 8,330,716 B2
(45) Date of Patent: Dec. 11, 2012

(54) INPUT DEVICE AND DATA PROCESSING SYSTEM

(75) Inventor: Yasushi Nakaoka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 437 days.

(21) Appl. No.: 12/638,644

(22) Filed: Dec. 15, 2009

(65) Prior Publication Data
US 2010/0156785 A1    Jun. 24, 2010

(30) Foreign Application Priority Data

Dec. 18, 2008  (JP) ................................ 2008-321909

(51) Int. Cl.
  *G09G 5/08*   (2006.01)
(52) U.S. Cl. ........................................................ 345/157
(58) Field of Classification Search .................. 345/157, 345/158; 73/514.32, 514.38
See application file for complete search history.

(56) References Cited

U.S. PATENT DOCUMENTS

| | | | |
|---|---|---|---|
| 6,082,197 A * | 7/2000 | Mizuno et al. ............. | 73/514.36 |
| 2008/0015031 A1 | 1/2008 | Koizumi et al. | |
| 2009/0126490 A1 * | 5/2009 | Sameshima ................ | 73/514.32 |
| 2009/0299142 A1 * | 12/2009 | Uchiyama et al. ........... | 600/118 |
| 2010/0156788 A1 * | 6/2010 | Nakaoka ..................... | 345/158 |

FOREIGN PATENT DOCUMENTS

| | | |
|---|---|---|
| EP | 0625744 A1 | 4/1994 |
| JP | 6-311564 A | 11/1994 |
| JP | 2001-56743 A | 2/2001 |
| JP | 2003-240542 A | 8/2003 |
| JP | 2007-52696 A | 3/2007 |
| JP | 2007-296173 A | 11/2007 |

* cited by examiner

*Primary Examiner* — Fred Tzeng
(74) *Attorney, Agent, or Firm* — Global IP Counselors, LLP

(57) ABSTRACT

An input device includes a main body and a motion sensor unit. The main body has a longitudinal axis. The motion sensor unit is configured and arranged to detect rotation of the main body about the longitudinal axis. The motion sensor unit has an X-axis angular velocity sensor configured and arranged to detect an angular velocity of the main body about an X-axis in a three-dimensional orthogonal coordinate system defined by the X-axis, a Y-axis and a Z-axis. The X-axis coincides with the longitudinal axis of the main body and the Y-axis and the Z-axis being orthogonal to each other in a first plane perpendicular to the X-axis.

8 Claims, 15 Drawing Sheets

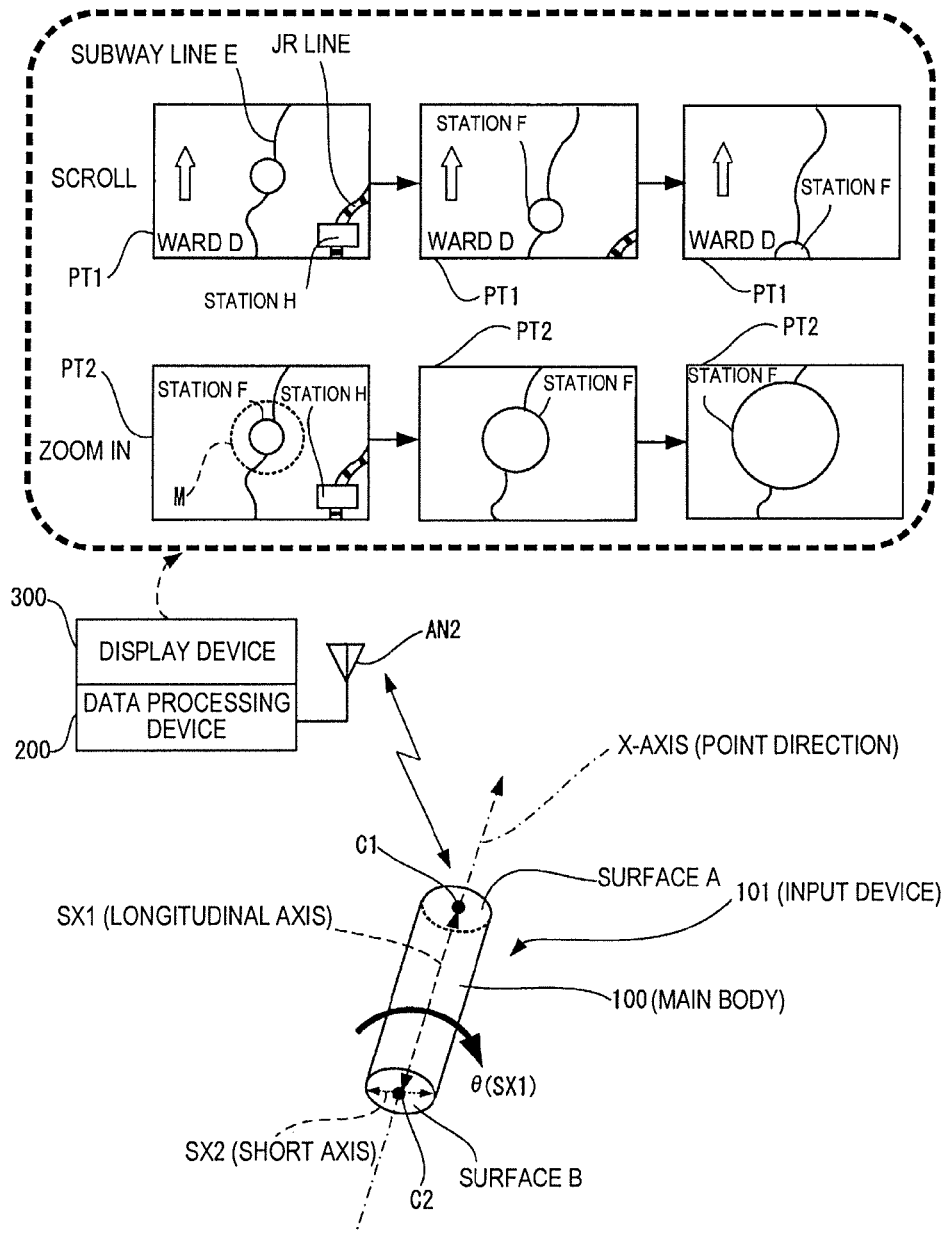
F I G. 1

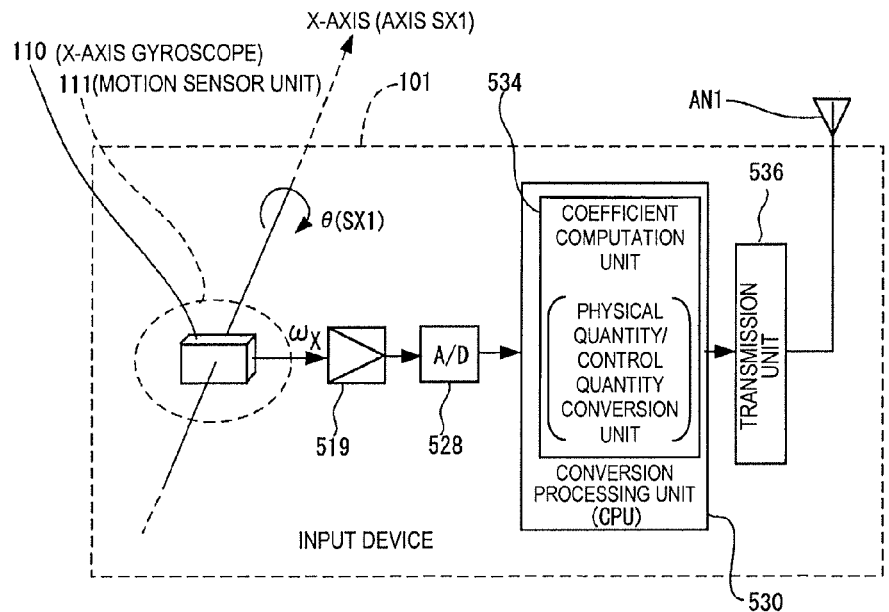
F I G. 2
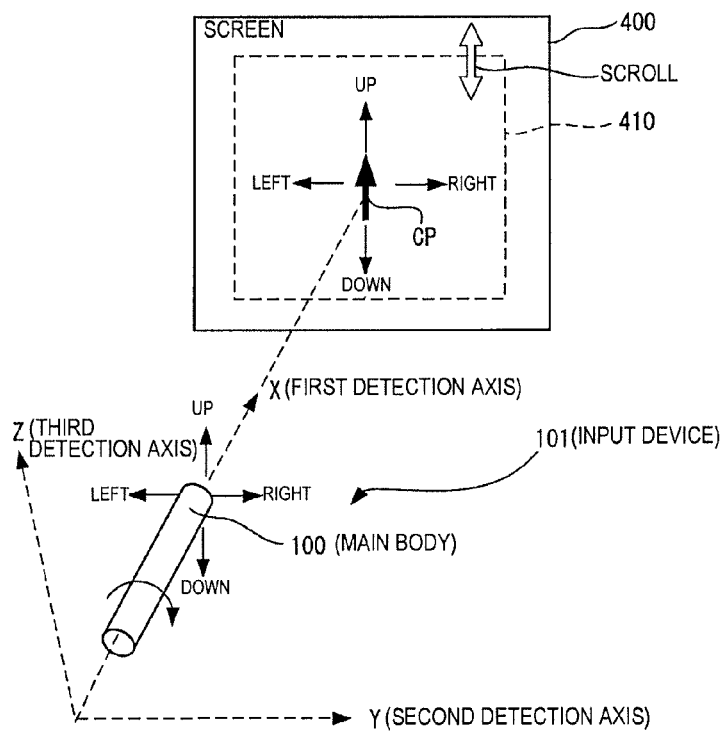
F I G. 3

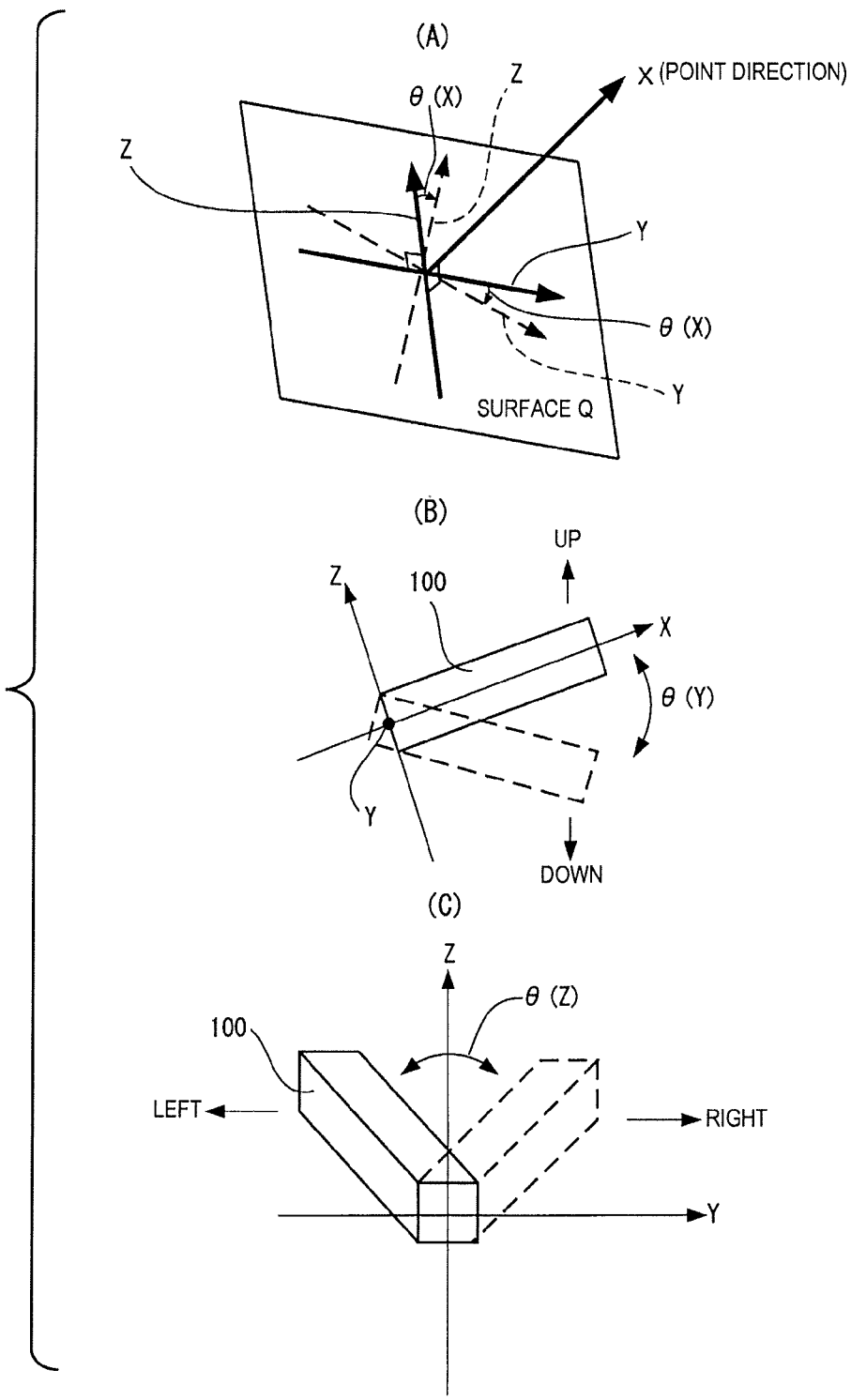
F I G. 4

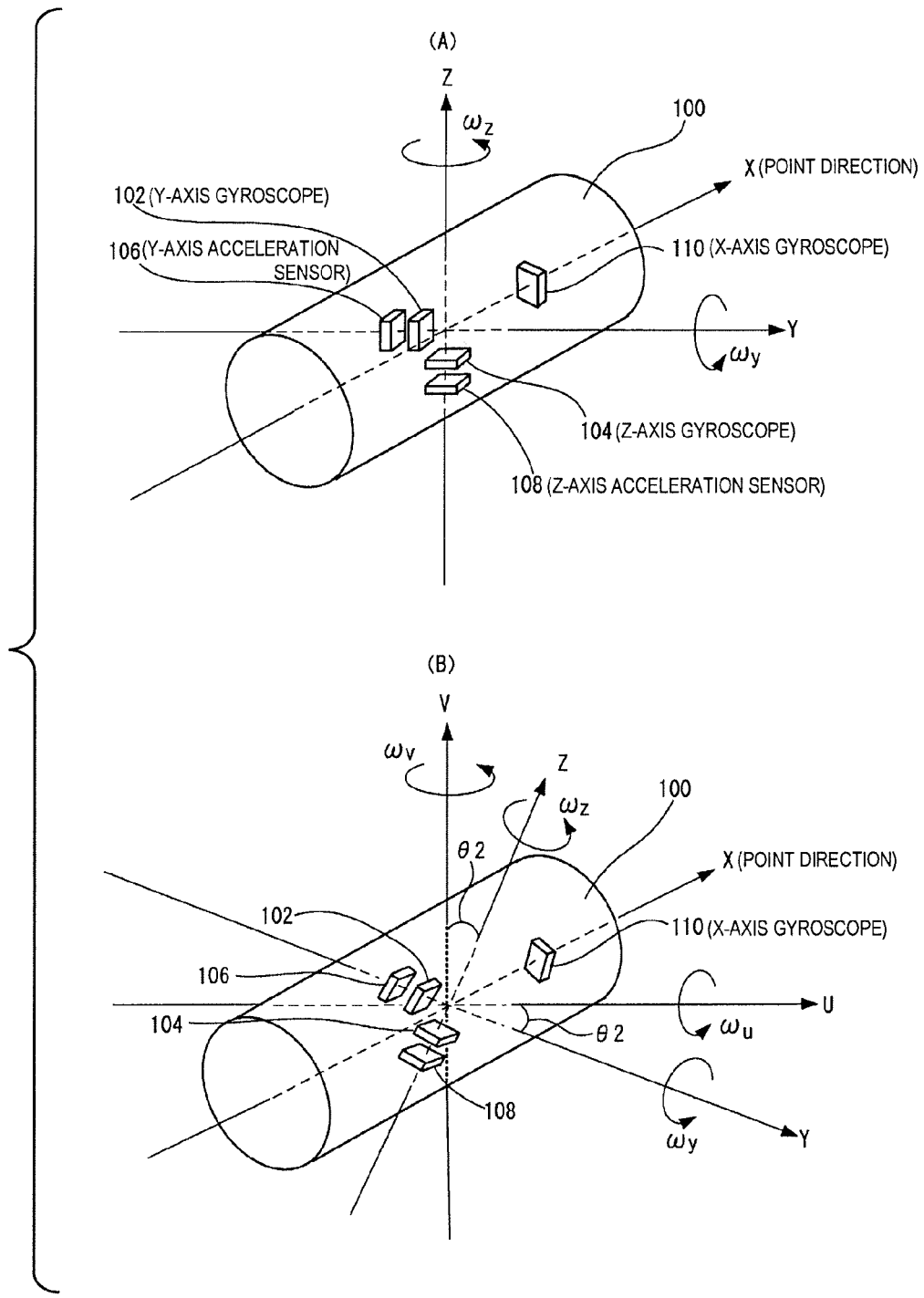
F I G. 5

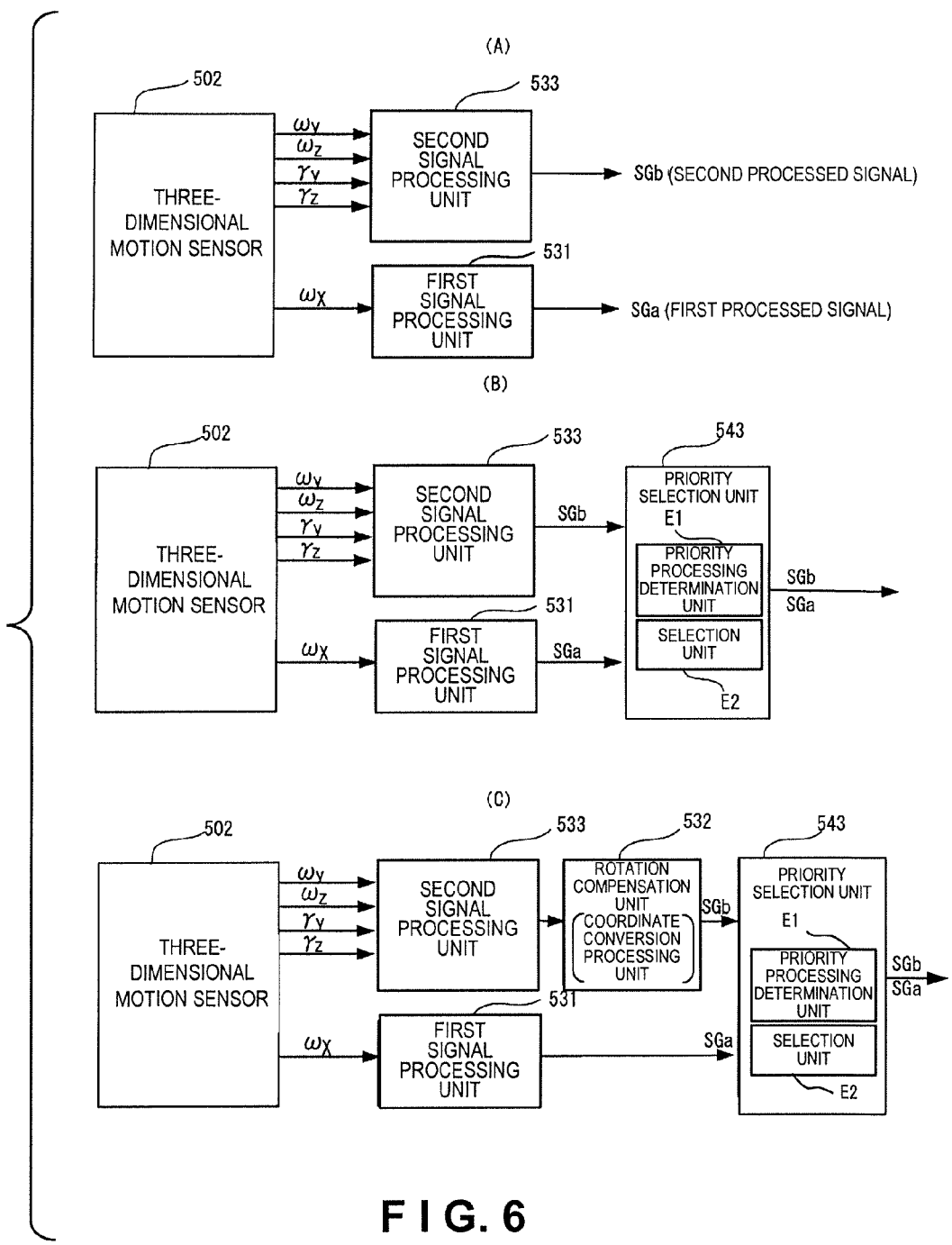
F I G. 6

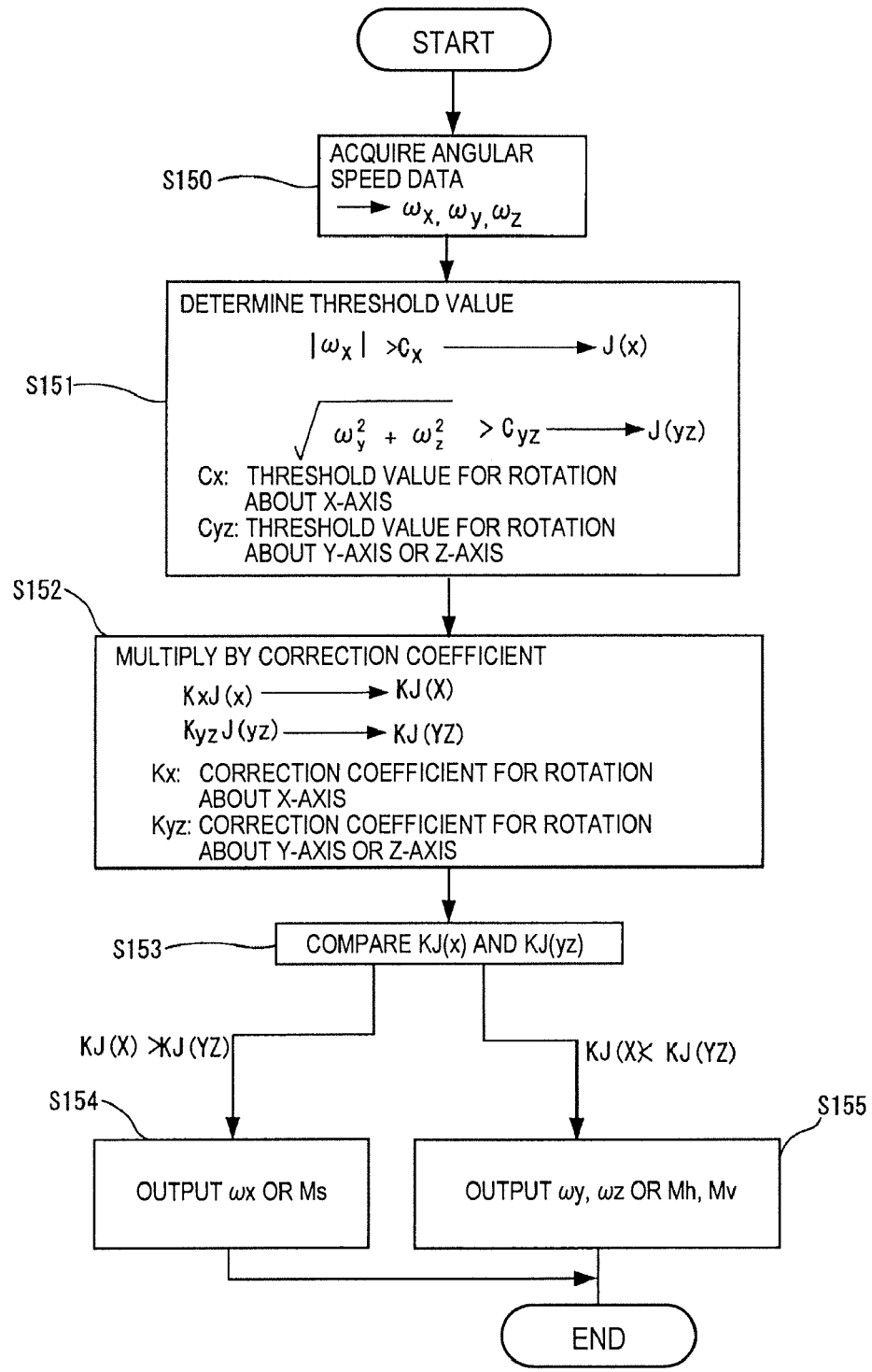
F I G. 8

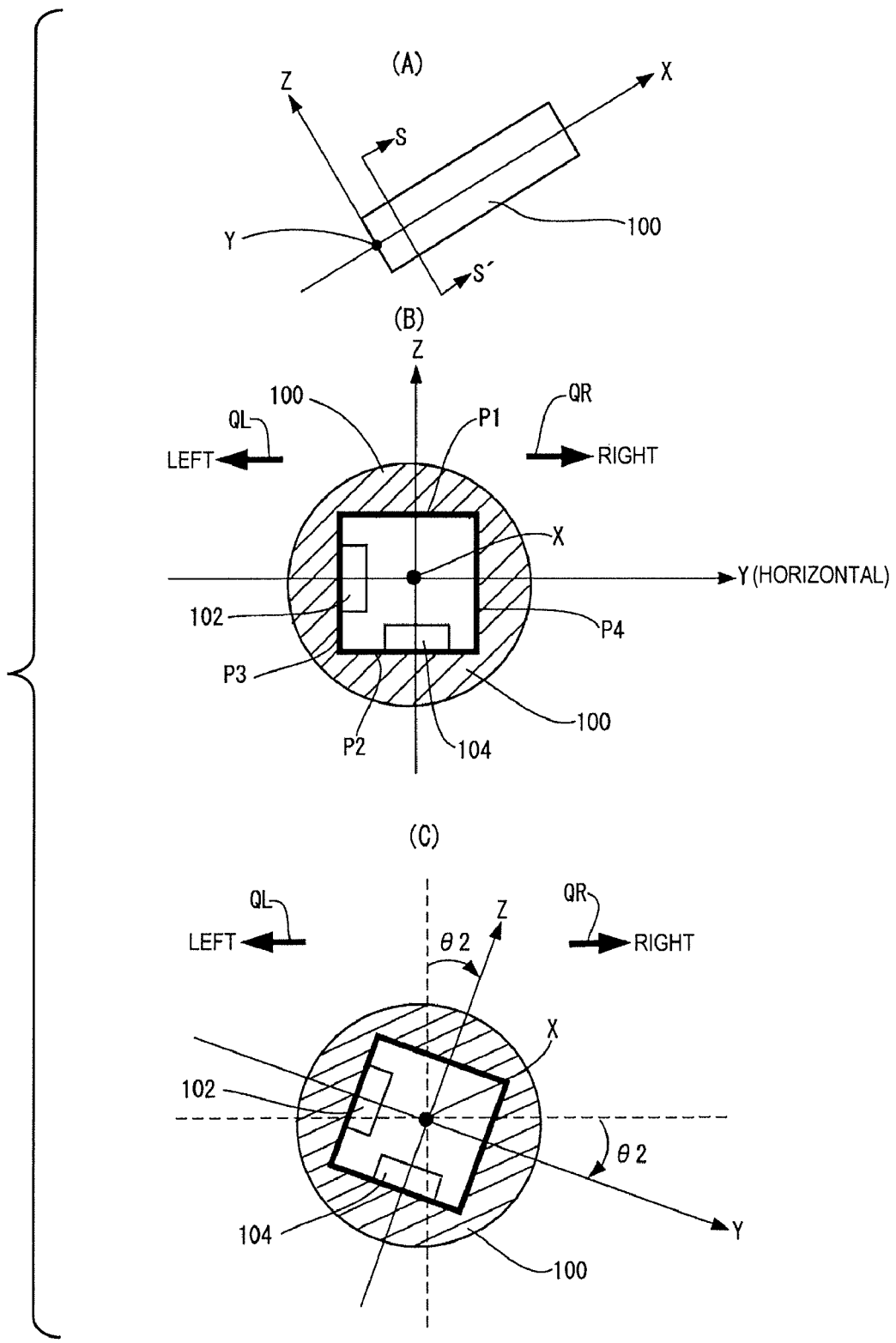
F I G. 9

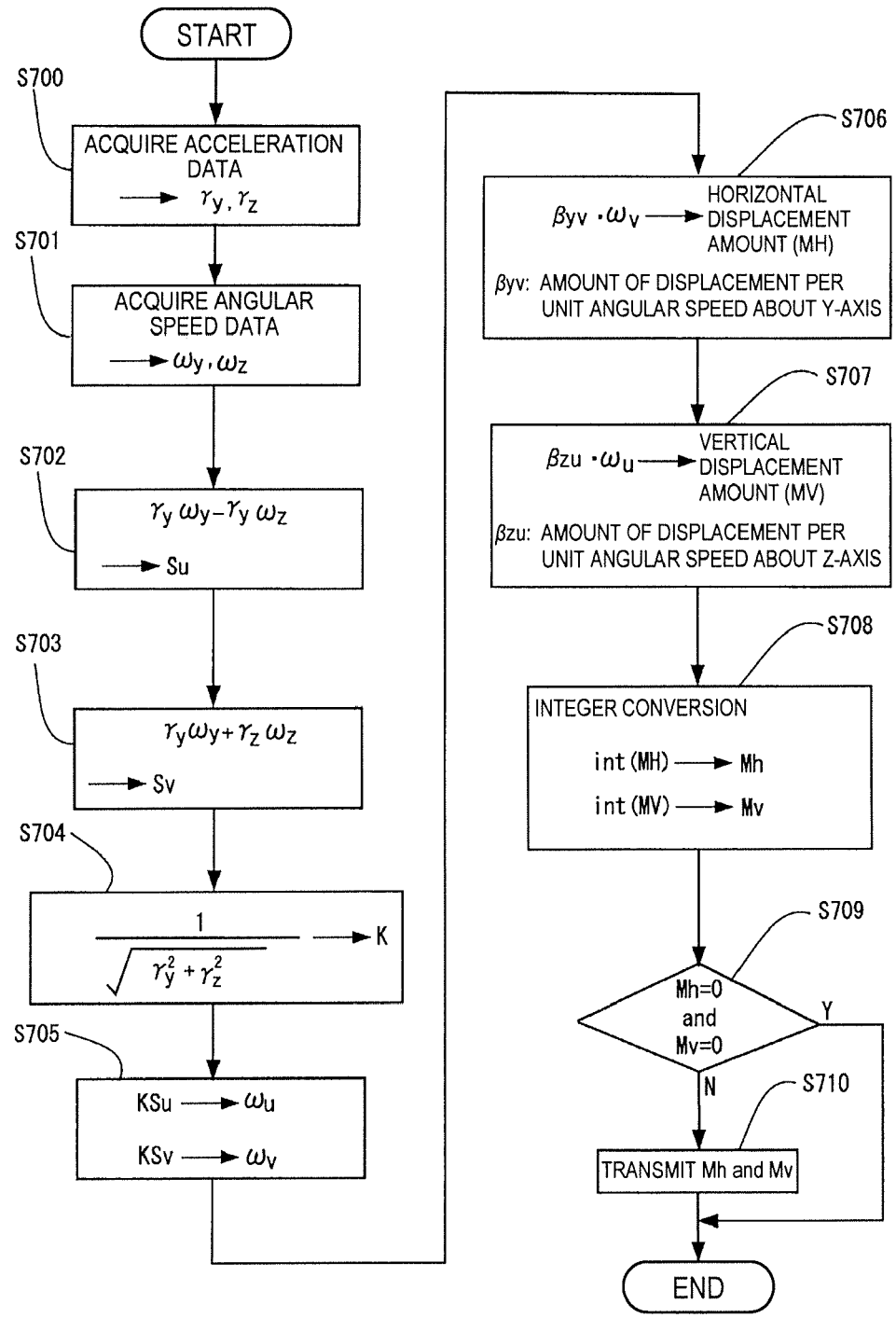
F I G. 13

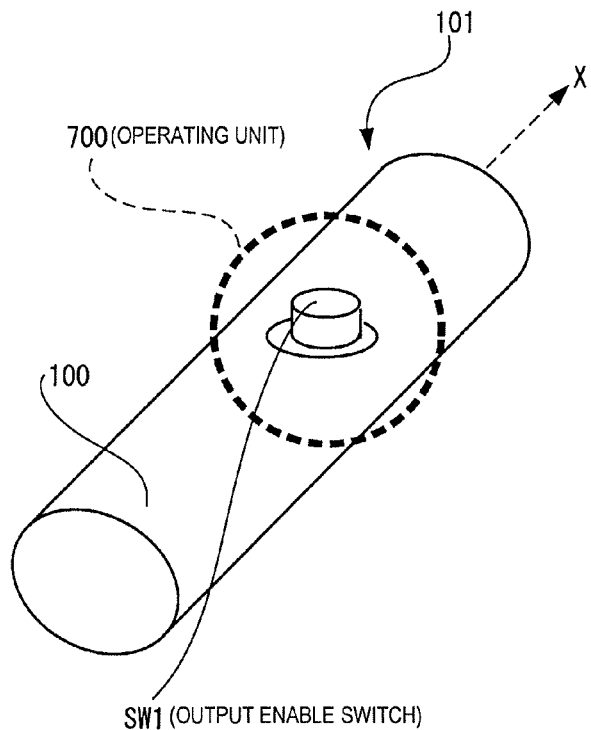
F I G. 14
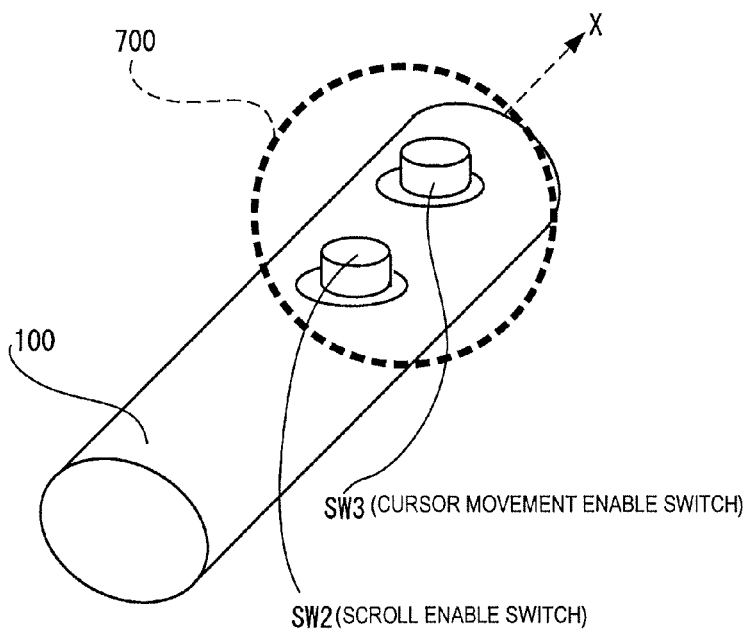
F I G. 15

INPUT DEVICE AND DATA PROCESSING SYSTEM

CROSS-REFERENCE TO RELATED APPLICATIONS

This application claims priority to Japanese Patent Application No. 2008-321909 filed on Dec. 18, 2008. The entire disclosure of Japanese Patent Application No. 2008-321909 is hereby incorporated herein by reference.

BACKGROUND

1. Technical Field

The present invention relates to an input device and to a data processing system.

2. Related Art

The need has recently increased for a system that utilizes an input device for generating and outputting a physical quantity signal in accordance with the motion of a main body (including at least one of the orientation (including rotation) of the main body (housing) and the movement (including translational movement) of the main body) in space (e.g., a three-dimensional mouse or the like).

Japanese Laid-Open Patent Publication No. 2001-56743, for example, discloses a technique that utilizes a button-operated input device in which a cursor pointer is moved on an image display device by movement of a mobile device in three-dimensional space (three-dimensional mouse). More specifically, this publication discloses an input device (pointing device) in which rotational motion in two axes (Y-axis, Z-axis) perpendicular to a longitudinal axis of a main body is detected using two gyroscopes (angular velocity sensors), and the detection signal is sent without modification to a control device as operation information. This input device can be used instead of a pointing rod or a laser pointer. For example, when a user holding the input device in hand waves the distal end of the main body (housing) of the input device to the left or right, the position of a cursor on a display unit, for example, moves correspondingly left or right.

SUMMARY

In mouse devices as the conventional pointing devices, scroll wheels (scroll dials) and the like have recently come to be provided. This makes it possible not only to move a cursor pointer or the like, but also to easily scroll the display screen in the display unit. By adding scrolling functionality to a mouse device, when a document having a tall vertical dimension is displayed, for example, the display screen can easily be scrolled up and down, and convenience to the user is consequently enhanced.

In contrast, when scrolling a display screen through the use of a conventional motion-sensor-equipped input device (three-dimensional pointing device or the like), the user must position the cursor pointer over a scrollbar on the display screen and drag the cursor pointer by moving the input device, for example. Consequently, extremely fine and precise operation of the input device is required from the user.

An input device may also be provided with an operating unit having a scroll wheel or the like, and may be configured so that the display screen can be scrolled or zoomed in or out (the zoom factor is adjusted) by operating a dial or switch. However, since the input device is used while being held in space by the user, a dial or switch is difficult to stably operate.

An input device is preferably small and light in order to be easily operable by hand. Consequently, the number of dials or switches that can be provided to the main body (housing) of the input device is limited. This limitation is an obstacle to adding multifunction capability to a three-dimensional input device.

According to at least one embodiment of the present invention, an input device can be provided that is capable of simple scrolling and the like of a display screen. It is also possible to easily add functionality for moving a cursor pointer vertically and horizontally, and functionality for scrolling and the like of the display screen, for example. A pointing device having similar operating properties to a mouse, for example, or a convenient, multi-function pointing device that has similar operating properties to a pointing rod or laser pointer can therefore be provided that is capable of easy scrolling and the like of a display screen.

An input device according to a first aspect includes a main body and a motion sensor unit. The main body has a longitudinal axis. The motion sensor unit is configured and arranged to detect rotation of the main body about the longitudinal axis.

The motion sensor unit detects rotation about the longitudinal axis (long axis) of the main body (housing) of the input device that has the longitudinal axis (long axis). The "longitudinal direction" of the main body (housing) is generally the "direction in which the main body (housing) extends (direction of generally linear extension)", and the "longitudinal axis" is the "axis that coincides with the longitudinal direction," for example.

Rotation of the main body (housing) can be detected by detecting the angular velocity of rotation through the use of a gyroscope, for example, and can also be detected by detecting a tilt of the main body about the longitudinal axis through the use of an acceleration sensor. The physical quantity signal outputted from the motion sensor unit can be utilized to control movement of a control object, and for other control. For example, the scrolling direction and scrolling amount of a display screen can be controlled according to the physical quantity signal. The zoom factor of a display image in the display screen (or a specific area in the display screen), for example, can also be controlled according to the physical quantity signal.

As described above, since an input device is used while being held in space in the hand of a user, a dial or switch is difficult for the user to stably operate, but the user can easily rotate the main body (housing) clockwise or counterclockwise about the longitudinal axis. Consequently, through the present configuration, a user can easily scroll, zoom, or perform other functions of a display screen, for example, using the input device, and the convenience of the input device is enhanced. Since there is no need to provide a dial, switch, or the like to the housing, the user interface of the input device can be simplified.

In the present specification, the distal end of the main body (housing) in space is described as being in the direction of pointing (pointing direction or point direction). The pointing direction (point direction) is determined by the orientation of the main body (housing) in space, and is conceptually distinct from the longitudinal axis (axis determined by the shape of the housing). However, when spatial coordinates are used as a reference, i.e., when the orientation of the housing in space is defined, the "longitudinal direction of the main body (housing)" coincides with the "point direction of the main body (housing)". Thus, in the present specification, when the orientation in space of the main body (housing) of the input device is not relevant, an expression such as "longitudinal direction" or "longitudinal axis" is generally used, and when the orientation in space is relevant, an expression such as "pointing direction or point direction," or "X-axis (axis in three-dimensional space that coincides with the point direction)" is used. As described above, the expressions "longitudinal axis," "point direction axis," and "X-axis" can be treated as ultimately coinciding with each other.

According to another aspect, the motion sensor unit has an X-axis angular velocity sensor configured and arranged to detect an angular velocity of the main body about an X-axis in a three-dimensional orthogonal coordinate system defined by the X-axis, a Y-axis and a Z-axis. The X-axis coincides with the longitudinal axis of the main body and the Y-axis and the Z-axis are orthogonal to each other in a first plane perpendicular to the X-axis.

In this aspect, a three-dimensional orthogonal coordinate system is defined by an X-axis, a Y-axis, and a Z-axis. The input device is provided with an X-axis angular velocity sensor for detecting the angular velocity of rotation about the X-axis. The angular velocity signal outputted from the X-axis angular velocity sensor can be utilized to control movement of a control object, and for other control. For example, the scrolling direction and scrolling amount of a display screen can be controlled according to the physical quantity signal, and the zoom factor of a display image in a display screen (or a specific area in the display screen), for example, can also be controlled.

According to another aspect, the input device further includes a physical quantity/control quantity conversion unit configured to convert a physical quantity signal outputted from the motion sensor unit to a control quantity signal indicative of a control quantity for controlling a control object.

The angular velocity signal or the like detected by the motion sensor unit provided to the input device can be transmitted unaltered as a control signal or the like to a data processing device, for example. However, in this case, the data processing device computes a control quantity (e.g., amount of displacement of a cursor pointer, amount of panning of a remotely operated camera, scroll amount of a display screen, zoom factor of a display screen, or the like) for a control object in a display unit based on the received angular velocity signal, and the load on the data processing device is correspondingly increased.

Therefore, in the present aspect, a physical quantity/control quantity conversion unit is provided to the input device, and the angular velocity signal or the like is converted at the input device to a control quantity for a control object in the display unit. Information (control quantity signal) relating to the obtained control quantity is then transmitted to a data processing device or the like. The processing load on the reception side (data processing device or the like) is thereby reduced.

In another aspect of the input device, the motion sensor unit further includes a Y-axis angular velocity sensor configured and arranged to detect an angular velocity of the main body about the Y-axis, and a Z-axis angular velocity sensor configured and arranged to detect an angular velocity of the main body about the Z-axis. The input device further comprises a first signal processing unit configured to execute first signal processing based on an X-axis angular velocity signal received from the X-axis angular velocity sensor, and a second signal processing unit configured to execute second signal processing based on a Y-axis angular velocity signal received from the Y-axis angular velocity sensor and a Z-axis angular velocity signal received from the Z-axis angular velocity sensor.

According to the present aspect, the input device is capable of detecting rotation about the Y-axis and Z-axis, and rotation about the X-axis independently in order to detect three-dimensional movement of the main body (housing) in the three-dimensional orthogonal coordinate system defined by the X-axis, Y-axis, and Z-axis. A signal processing system for detecting rotation about the Y-axis and Z-axis, and a signal processing system for detecting rotation about the X-axis are therefore provided. Therefore, in the present aspect, the input device is provided with a first signal processing unit for executing first signal processing based on the angular velocity signal for the X-axis, and a second signal processing unit for executing second signal processing based on the angular velocity signal for the Y-axis and Z-axis.

For example, the first signal processing unit and the second signal processing unit can be implemented by first hardware and second hardware, respectively (i.e., different hardware). For example, when shared hardware is controlled by software (e.g., when a CPU is used), the first signal processing unit and second signal processing unit can each be implemented by preparing a signal processing routine for each signal processing unit.

According to another aspect, the input device further includes a priority selection unit including a priority processing determination unit configured to determine which one of the first signal processing and the second signal processing is to be given priority, and a selection unit configured to selectively output one of a first processed signal outputted from the first signal processing unit and a second processed signal outputted from the second signal processing unit based on determination by the priority processing determination unit.

As described above, rotation about the Y-axis and Z-axis, and rotation about the X-axis are detected independently, and a first signal processing unit and a second signal processing unit are provided. However, in reality, rotation about the Y-axis and Z-axis, and rotation about the X-axis can occur simultaneously. In other words, when a user holding the main body (housing) of the input device in hand waves the distal end of the main body (housing) slightly horizontally or vertically (i.e., causes slight rotation about the Y-axis and/or Z-axis), or rotates the main body (housing) about the X-axis, rotation about the Y-axis and Z-axis, and rotation about the X-axis may occur simultaneously. As the user holds and operates the main body of the input device, some unwanted and unintentional rotation is unavoidable during actual use.

For example, when the user rotates the main body (housing) about the X-axis to scroll the display screen, rotation about the Y-axis or Z-axis occurs against the user's intention, and when this causes the cursor pointer to unexpectedly move on the display screen, the operating precision or reliability of the input device is reduced.

Consequently, it is preferred that the input device be capable of determining which processing by a signal processing unit to give priority to and select an output signal when a situation occurs in which the first signal processing unit and the second signal processing unit are operating simultaneously in parallel fashion. Therefore, a priority selection unit is provided to the input device in the present aspect. The priority selection unit has a priority processing determination unit, and a selection unit for selectively outputting any one of a first processed signal outputted from the first signal processing unit, and a second processed signal outputted from the second signal processing unit, based on the determination by the priority processing determination unit. Operations not intended by the user are thereby reliably prevented, and the operating precision or reliability of the input device is prevented from decreasing.

According to another aspect of the input device, the motion sensor unit further includes a Y-axis acceleration sensor configured and arranged to detect an acceleration of the main body in a Y-axis direction, and a Z-axis acceleration sensor configured and arranged to detect an acceleration of the main body in a Z-axis direction. The second signal processing unit further includes a coordinate conversion processing unit configured to perform coordinate conversion processing in which the Y-axis angular velocity detected by the Y-axis angular velocity sensor and the Z-axis angular velocity detected by the Z-axis angular velocity sensor are converted to a U-axis angular velocity and a V-axis angular velocity, respectively, in a two-dimensional orthogonal coordinate system defined by a U-axis that is a horizontal axis in the first plane perpendicular to the X-axis and a V-axis that is perpendicular to the U-axis in the first plane. The coordinate conversion processing unit is configured to perform the coordinate conversion processing based on the acceleration detected by the Y-axis acceleration sensor and the acceleration detected by the Z-axis acceleration sensor.

In order to detect rotation about the Y-axis and Z-axis, and rotation about the X-axis independently, a first signal processing unit and a second signal processing unit may be provided as described above, and a priority selection unit may be further provided as described above. However, in order to maintain independence between detection of rotation about the Y-axis and Z-axis, and detection of rotation about the X-axis, a configuration is preferably adopted whereby rotation of the main body (housing) about the X-axis does not affect detection of rotation about the Y-axis and Z-axis.

For example, the angular velocity sensors corresponding to each axis are fixed to a flat surface (e.g., inner wall surface of the housing) provided to the main body of the input device. The Y-axis and Z-axis thereby rotate in the same manner when the main body (housing) of the input device rotates about the X-axis, and the position of the Y-axis angular velocity sensor or Z-axis angular velocity sensor in space also moves. There is a difference (measurement error) between the angular velocity detected by the Y-axis angular velocity sensor and the Z-axis angular velocity sensor in a state in which rotation occurs about the X-axis and the angular velocity detected in a state in which no rotation occurs about the X-axis.

Therefore, in the present aspect, the detection error is suppressed by performing rotation compensation processing and correcting the detection signal. In the present aspect, a two-dimensional YZ orthogonal coordinate system is defined by the Y-axis and Z-axis in a first plane perpendicular to the X-axis, the X-axis coinciding with the pointing direction of the main body, and a two-dimensional second orthogonal coordinate system (UV orthogonal coordinate system) is defined by a U-axis that is the horizontal axis in the first plane perpendicular to the X-axis, and a V-axis that is an axis perpendicular to the U-axis in the first plane, the X-axis coinciding with the pointing direction of the main body. The U-axis is a horizontal axis in the first plane, and the V-axis is a vertical axis orthogonal to the U-axis in the first plane. The U-axis and the V-axis are each uniquely defined by specifying the pointing direction (point direction) of the main body, and are not affected by rotation of the input device about the X-axis.

In the present aspect, the coordinate conversion processing unit executes a coordinate conversion (rotation coordinate conversion) from the YZ orthogonal coordinate system to the second orthogonal coordinate system (UV orthogonal coordinate system), and converts the Y-axis angular velocity detected by the Y-axis angular velocity sensor, and the Z-axis angular velocity detected by the Z-axis angular velocity sensor to a U-axis angular velocity and a V-axis angular velocity, respectively. The angular velocities detected for the Y-axis and Z-axis (including the measurement error that accompanies rotation when rotation about the X-axis occurs) are thereby corrected to the correct angular velocities for a state in which there is no rotation of the main body about the X-axis.

The rotation angle between the Y-axis and the U-axis (between Z-axis and V-axis) in the first plane orthogonal to the X-axis must be determined in order for coordinate axis conversion (rotation coordinate conversion) to be executed. Therefore, in the present aspect, a Y-axis acceleration sensor is provided in addition to the Y-axis angular velocity sensor as a physical quantity measurement device for the Y-axis as the detection axis, and a Z-axis acceleration sensor is provided in addition to the Z-axis angular velocity sensor as a physical quantity measurement device for the Z-axis as the detection axis. When the main body (housing) of the input device rotates about the X-axis, which is the pointing direction axis, the acceleration detected for the Y-axis and the acceleration detected for the Z-axis each vary according to the rotation angle. Specifically, the Y-axis acceleration and the Z-axis acceleration are expressed by an equation that includes the rotation angle in the first plane as a parameter (variable). Rotation angle information can thus be obtained when the Y-axis acceleration and the Z-axis acceleration can be detected. The Y-axis angular velocity and the Z-axis angular velocity can be converted to a U-axis angular velocity and a V-axis angular velocity by executing rotation coordinate conversion based on the obtained rotation angle information.

Through the present aspect, rotation of the main body (housing) about the X-axis does not affect detection of rotation about the Y-axis and Z-axis. Consequently, through the present aspect, complete independence can be ensured between detection of rotation about the Y-axis and Z-axis, and detection of rotation about the X-axis.

According to another aspect, the input device further includes an operating unit including an output enable switch configured and arranged to switch between enabling and disabling signal output from the input device.

In the present aspect, the input device is provided with an operating unit (e.g., a press-type or slide-type output enable switch) for switching between enabling and disabling signal output from the input device. Various types of variations are possible in the configuration of the operating unit. For example, when the input device has a cursor pointer movement control function (first control function) and a display screen scrolling function (second control function), an output enable switch may be provided for each of the functions, or a shared output enable switch may be provided for controlling the enabling/disabling of each function in common. Since the output enable switch can be operated independently of the orientation of the main body (housing) in space, the output enable switch is easy for the user to operate.

Signals are outputted from the input device only when the user is operating the operating unit (e.g., only when the user is pressing the output enable switch). Consequently, during periods in which the operating unit is not being operated (e.g., periods in which the output enable switch is not pressed), even when the main body (housing) is moved, there is no positional displacement or the like of the control object (e.g., cursor pointer), for example. Through the present aspect, movement of the control object not intended by the user can be reliably prevented, and the convenience of the input device is further enhanced.

According to another aspect, the input device further includes an operating unit including an output enable switch configured and arranged to switch between enabling and disabling signal output from the input device.

For example, the input device has a cursor pointer movement control function (first control function) and a display screen scrolling function (second control function), but the user may sometimes wish to utilize only the first control function. Therefore, in the present aspect, a switch for switching between functions (types of signal processing) is provided to the input device so that any one function can be selected from among the plurality of functions of the input device. The user can thereby selectively utilize a single desired function from among the plurality of functions of the input device. Convenience to the user is therefore further enhanced.

According to another aspect of the input device, the first signal processing unit is configured to execute the first signal processing to output a first processed signal corresponding to a control quantity signal indicative of at least one of a scroll amount of a display screen and a zoom factor of a display image, and the second signal processing unit is configured to execute the second signal processing to output a second processed signal corresponding to a control quantity signal relating to displacement of a cursor pointer on the display screen.

Through the present aspect, the user can easily scroll or zoom the display screen by rotating the main body (housing) of the input device about the X-axis (longitudinal axis), and the user can move the cursor pointer horizontally and vertically, for example, on the display screen by waving the distal end of the main body (housing) a small amount horizontally and vertically, for example. A pointing device having similar operating properties to a mouse device, for example, or a convenient, multi-function pointing device that has similar operating properties to a pointing rod or laser pointer can therefore be provided that is capable of easy scrolling and the like of a display screen.

A data processing system according to another aspect includes the input device as described above and a data processing device configured and arranged to receive a transmission signal from the input device and to execute prescribed data processing based on the signal received from the input device.

The convenience of a three-dimensional input device is enhanced through the use of at least one of the aspects of the present invention described above. The use of three-dimensional space is becoming more common in computers, and accordingly there is currently an increasing need for a highly convenient system that utilizes a three-dimensional input device capable of inputting three-dimensional movement. Through the present aspect, a data processing system can be provided that uses a multifunction, small-sized three-dimensional input device having excellent operating properties.

BRIEF DESCRIPTION OF THE DRAWINGS

Referring now to the attached drawings which form a part of this original disclosure:

FIG. 1 is a schematic view showing an example of the configuration of a data processing system that utilizes an input device;

FIG. 2 is a block diagram showing an example of the internal structure of the input device for detecting rotation about the X-axis;

FIG. 3 is a schematic view showing an example of the utilization of an input device for detecting rotation about the X-axis, the Y-axis, and the Z-axis;

FIGS. 4(A) through 4(C) are schematic views showing detection of slight displacement of the distal end of a main body (housing) of the input device in the Y-axis direction or the Z-axis direction;

FIGS. 5(A) and 5(B) are schematic views showing an example of the internal structure of the input device for detecting rotation about the X-axis, Y-axis, and Z-axis;

FIGS. 6(A) through 6(C) are block diagrams showing configurations for independently detecting rotation about the X-axis and rotation about the Y-axis and Z-axis;

FIG. 8 is a flowchart showing the processing sequence executed by the priority selection unit;

FIGS. 9(A) through 9(C) are schematic views for describing angular velocity detection error due to rotation about the X-axis of the input device;

FIG. 13 is a flowchart showing the processing sequence of the coordinate conversion processing for rotation compensation;

FIG. 14 is a schematic view showing an example of the external structure of another example (in which an output enable switch is provided) of an input device for detecting rotation about the X-axis, rotation about the Y-axis, and rotation about the Z-axis;

FIG. 15 is a schematic view showing an example of the external structure of yet another example (in which a plurality of enable switches are provided) of an input device for detecting rotation about the X-axis, rotation about the Y-axis, and rotation about the Z-axis;

DETAILED DESCRIPTION OF EXEMPLARY EMBODIMENTS

Figure 7:
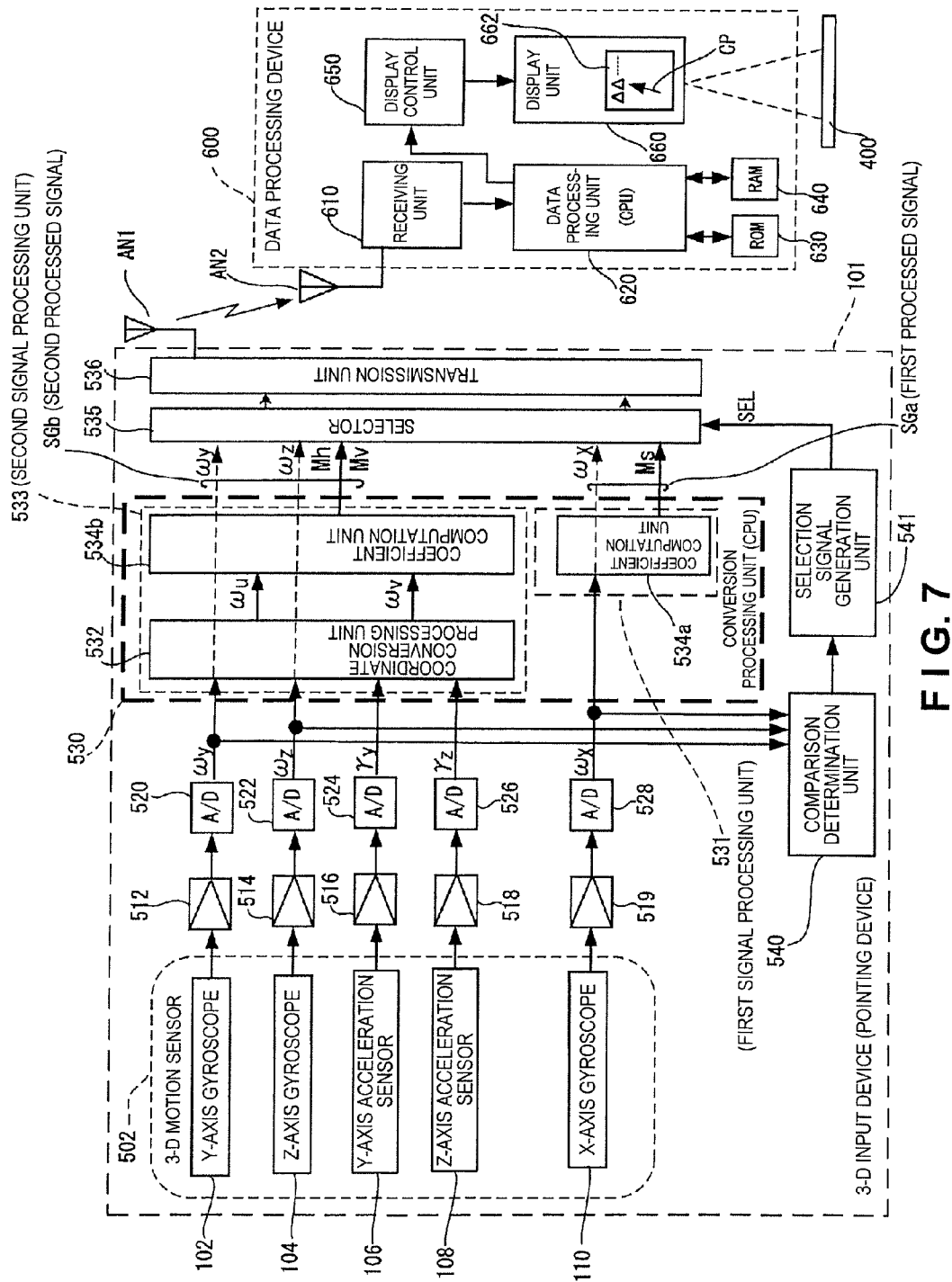
FIG. 7 is a block diagram showing an example of the structure of a data processing system that utilizes a three-dimensional input device for detecting rotation about each of the X-axis, the Y-axis, and the Z-axis.

Embodiments of the present invention will next be described with reference to the drawings. The embodiments described hereinafter do not limit the scope of the present invention described in the claims, and the configurations described in the embodiments are not necessarily essential as means of achieving the objects of the present invention.

First Embodiment

Example of Three-Dimensional Input Device

FIG. 1 is a view showing an example of the configuration of a data processing system that utilizes an input device (in this instance, a three-dimensional input device is a pointing device that can be used instead of a mouse or laser pointer, for example).

In FIG. 1, a data processing system is formed by an input device 101, a data processing device 200 (having a wireless antenna AN2), and a display device 300. The input device 101 and the data processing device 200 can transmit and receive signals (information) by communication (wireless communication in this instance; however, this configuration is not limiting, and wired communication, optical communication, or the like may be used).

The input device 101 has a longitudinal axis (long axis) SX1 and a motion sensor unit (not shown in FIG. 1). The motion sensor unit has an angular velocity sensor (e.g., a gyroscope), an acceleration sensor, or the like, for example, and can detect rotation of a main body (housing) 100 of the input device 101 about the longitudinal axis (long axis) SX1. A physical quantity (angular velocity of rotation, acceleration, or the like) that occurs due to rotation about the longitudinal axis (long axis) SX1 can be used to control the scroll amount of the display screen, control variation of the zoom factor of the display screen (or a designated region in the display screen), or for other control.

In the example shown enclosed by a dashed line at the top of FIG. 1, a map of a region of Tokyo is shown on a display screen or display, for example, by the display device 300. A user holding the main body (housing) 100 of the input device 101 rotates (the direction of the arrow in the drawing being the positive direction) the main body 100 an amount θ(SX1) in the direction of the arrow in the drawing about the longitudinal axis SX1.

A display screen PT1 is then scrolled upward, for example. When the user rotates the main body 100 in the negative direction, the display screen PT1 is scrolled downward. Alternatively, rotation of the main body about the longitudinal axis SX1 may be used to selectively zoom in or out in the display screen. For example, the zoom factor of a designated region M of a display screen PT2 may increase and the image may be enlarged as the user rotates the main body in the positive direction. When the user rotates the main body (housing) 100 in the negative direction, the zoom factor of the designated region M of the display screen PT2 may decrease, and the image may be reduced in size. The input device may be configured such that the user can switch between screen-scrolling and zooming by operating a switch (not shown) or the like provided on the main body 100.

As described above, since the input device 101 is used in a state in which the main body (housing) 100 thereof is held in space by the user, a dial or switch is difficult for the user to stably operate, but the user can easily rotate the main body (housing) 100 clockwise or counterclockwise about the longitudinal axis SX1. Consequently, in the data processing system shown in FIG. 1, the user can easily scroll, zoom, or perform other display screen functions, for example, using the input device 101, and the convenience of the input device 101 is markedly enhanced. Moreover, since there is no need to provide a dial, switch, or the like to the housing, the user interface of the input device can be simplified.

The input device 101 shown in FIG. 1 has the appearance of cylinder, for example. The main body (housing) 100 of the input device 101 has the longitudinal axis (long axis) SX1 and a short axis SX2 (axis orthogonal to the longitudinal axis SX1 and shorter than the longitudinal axis). The term "longitudinal direction" refers to the "direction in which the main body (housing) 100 extends generally linearly (direction of linear extension)."

In FIG. 1, a line segment is assumed that connects a center point C2 of a bottom surface B and a center point C1 of a top surface A of the cylindrical main body (housing) 100, and the axis that coincides with the line segment is the longitudinal axis SX1. The top surface A or bottom surface B can also be viewed as a vertical cross-section of the housing, and the "axis that coincides with the longitudinal direction and coincides with a normal line at the center point of a vertical cross-section of the housing" can be designated as the longitudinal axis SX1.

The longitudinal axis SX1 coincides with the X-axis (point direction axis) set in space. The point direction (pointing direction) is the "direction in which the distal end of the main body (housing) points in space." The "point direction" is determined by the orientation of the main body (housing) in space, and is conceptually distinct from the longitudinal axis (axis determined by the shape of the housing). However, when spatial coordinates are used as a reference, the result is considered to be that the "longitudinal direction of the main body (housing)" and the "point direction of the main body (housing)" coincide. Thus, in the present specification, when the orientation in space of the main body (housing) of the input device is not relevant, an expression such as "longitudinal direction" or "longitudinal axis" is generally used, and when the orientation in space is relevant, an expression such as "pointing direction or point direction," or "X-axis (axis in three-dimensional space that coincides with the point direction)" is used. As described above, the expressions "longitudinal axis," "point direction axis," and "X-axis" can be treated as ultimately coinciding with each other.

Example of Internal Structure of Input Device for Detecting Rotation about X-Axis FIG. 2 is a view showing an example of the internal structure of the input device for detecting rotation about the X-axis. The input device 101 shown in FIG. 2 has a motion sensor unit 111, and the motion sensor unit 111 has an X-axis gyroscope 110 (an angular velocity sensor) for detecting an angular velocity of rotation about the X-axis in a three-dimensional orthogonal coordinate system defined by an X-axis that coincides with the longitudinal axis SX1 of the main body (housing) 100, and a Y-axis and Z-axis that are orthogonal to each other in the plane perpendicular to the X-axis.

The input device 101 also has an amplifier 519, an A/D converter 528, a conversion processing unit (CPU or the like) 530, a transmission unit (communication unit) 536, and an antenna AN1. The conversion processing unit 530 is provided with a coefficient computation unit 534 as a physical quantity/control quantity conversion unit. The coefficient computation unit 534 converts an angular velocity signal to a displacement amount signal by multiplying the angular velocity signal by a conversion coefficient, for example.

In FIG. 2, a three-dimensional orthogonal coordinate system is defined in space by the X-axis, Y-axis, and Z-axis, and the input device 101 is provided with the X-axis gyroscope 110 for detecting the angular velocity of rotation about the X-axis. The angular velocity signal $\omega x$ outputted from the X-axis gyroscope 110 can be utilized to control movement of a control object (e.g., a cursor point), and for other control (e.g., scroll control of a display screen as the control object, or zoom factor variation control of the display screen or a specific display screen area as the control object). In the illustrated embodiments, the scrolling direction and scrolling amount of a display screen is controlled according to the physical quantity signal. In addition, other function (e.g., the zoom factor of a display screen (or a specific area in the display screen)) can also be controlled according to the physical quantity signal corresponding to the angular velocity signal $\omega x$ outputted from the X-axis gyroscope 110.

The angular velocity signal $\omega x$ detected by the motion sensor unit 111 (X-axis gyroscope 110) can be transmitted unaltered as a control signal or the like to the data processing device 200 (see FIG. 1), for example. However, in this case, the data processing device 200 computes a control quantity (e.g., amount of displacement of a cursor pointer, amount of panning of a remotely operated camera, scroll amount of a display screen, zoom factor of a display screen, or the like) for a control object in the display device 300 (see FIG. 1) based on the received angular velocity signal, and the load on the data processing device 200 is correspondingly increased.

Therefore, in FIG. 2, the coefficient computation unit 534 as a physical quantity/control quantity conversion unit is provided to the input device 101, and the angular velocity signal ωx is converted at the input device 101 to a control quantity for a control object in the display device 300. Information (control quantity signal) relating to the obtained control quantity is then transmitted to the data processing device 200. The processing load on the reception side (data processing device 200) is thereby reduced.

Example of Input Device for Detecting Rotation About X-Axis, Y-Axis, and Z-Axis

Only rotation about the X-axis is detected in the input device shown in FIG. 2. More information can be inputted if the input device is capable of detecting rotation not only about the X-axis, but also about the Y-axis and Z-axis. An input device for detecting rotation about the X-axis, the Y-axis, and the Z-axis will next be described.

FIG. 3 is a view showing an example of the utilization of an input device for detecting rotation about the X-axis, the Y-axis, and the Z-axis. In FIG. 3, a three-dimensional orthogonal coordinate system is defined by the X-axis which coincides with the longitudinal axis SX1 of the main body (housing) 100, and by the Y-axis and Z-axis orthogonal to each other in the plane perpendicular to the X-axis. The input device 101 detects rotation about each of the three axes of the main body (housing) 100.

In FIG. 3, the input device 101 is used instead of a laser pointer. A display screen 410 is displayed on, for example, a projection screen 400. The viewing area in the display screen 410 can be scrolled up and down. A cursor pointer CP moves vertically and horizontally on the display screen 410. In FIG. 3, the user controls the vertical and horizontal movement of the cursor pointer CP by displacing the distal end of the main body (housing) 100 slightly in the Y-axis direction or the Z-axis direction. Vertical scrolling of the display screen 410 is also controlled by rotating the main body (housing) 100 about the X-axis.

FIGS. 4(A) through 4(C) are views showing detection of slight displacement of the distal end of the main body (housing) 100 in the Y-axis direction or the Z-axis direction.

As shown in FIG. 4(A), a first orthogonal coordinate system in three-dimensional space is defined by the X-axis which coincides with the pointing direction (point direction) of the main body (housing) 100 of the input device 101, and by the Y-axis and Z-axis orthogonal to each other in a Q-plane which is a first plane perpendicular to the X-axis. The X-axis is a first detection axis, the Y-axis is a second detection axis, and the Z-axis is a third detection axis.

When the spatial orientation of the main body (housing) 100 of the input device 101 is specified, the first orthogonal coordinate system is uniquely defined. The first orthogonal coordinate system is not a fixed coordinate system, and as indicated by the dashed line in FIG. 4(A), when the main body (housing) of the input device 101 is rotated an amount θ(X) about the X-axis, the Y-axis and Z-axis accordingly rotate by the amount θ(X). In this arrangement, θ(X) indicates the angle of rotation about the X-axis as the rotational axis.

As shown in FIG. 4(B), slight vertical (perpendicular direction) movement of the main body (housing) 100 of the input device 101 can be detected as rotation (rotation angle θ(Y)) about the Y-axis as the rotational axis. In FIG. 4(B), the main body (housing) 100 of the input device 101 is drawn in a rectangular column shape for the sake of convenience. This rectangular column shape can be viewed as indicating the internal wall surfaces of the housing in which the motion sensor (angular velocity sensor or the like) is attached, for example. Consequently, information relating to the rotation angle θ(Y) about the Y-axis can be obtained by detecting the angular velocity of rotation about the Y-axis through the use of the Y-axis angular velocity sensor, and integrating the angular velocity over time. In other words, vertical movement of the main body (housing) 100 of the input device 101 can be detected.

As shown in FIG. 4(C), slight horizontal (horizontal direction) movement of the main body (housing) 100 can be detected as rotation (rotation angle θ(Z)) about the Z-axis as the rotational axis. Consequently, information relating to the rotation angle θ(Z) about the Z-axis can be obtained by detecting the angular velocity of rotation about the Z-axis through the use of the Z-axis angular velocity sensor, and integrating the angular velocity over time. In other words, horizontal movement of the main body (housing) 100 of the input device 101 can be detected.

FIGS. 5(A) and 5(B) are views showing an example of the internal structure of the input device for detecting rotation about the X-axis, Y-axis, and Z-axis. FIG. 5(A) shows a state in which there is no rotation of the housing about the X-axis, and FIG. 5(B) shows a state in which there is rotation (rotation angle θ2) of the housing about the X-axis.

The input device 101 has the X-axis gyroscope 110 for detecting the angular velocity ωox of rotation about the X-axis, a Y-axis gyroscope 102 (an angular velocity sensor) for detecting the angular velocity ωy of rotation about the Y-axis, a Z-axis gyroscope 104 (an angular velocity sensor) for detecting the angular velocity ωz of rotation about the Z-axis, a Y-axis acceleration sensor 106 for detecting acceleration in the Y-axis direction, and a Z-axis acceleration sensor 108 for detecting acceleration in the Z-axis direction. The X-axis gyroscope 110, Y-axis gyroscope 102, and Z-axis gyroscope 104 each output a positive value for the angular velocity in the directions indicated by arrows for each axis (counterclockwise direction in FIGS. 5(A) and 5(B)), and the Y-axis acceleration sensor 106 and Z-axis acceleration sensor 108 each output a positive value for the acceleration in the directions indicated by the arrows for each axis.

In FIG. 5(B), a two-dimensional second orthogonal coordinate system is defined by the U-axis as the horizontal axis, and the V-axis (perpendicular axis) perpendicular to the U-axis, in the Q-plane as a first plane perpendicular to the X-axis. This coordinate system relates to coordinate conversion processing for rotation compensation, and will be described hereinafter.

Independent Detection of Rotation about X-Axis and Rotation about Y-Axis and Z-Axis The input device 101 is be capable of detecting rotation about the Y-axis and Z-axis, and rotation about the X-axis independently in order to detect three-dimensional movement of the main body (housing) 100 of the input device 101 in the three-dimensional orthogonal coordinate system defined by the X-axis, Y-axis, and Z-axis.

A configuration such as shown in FIGS. 6(A) through 6(C), for example, is therefore preferably used as the configuration of the signal processing unit.

FIGS. 6(A) through 6(C) are views showing configurations for ensuring independence between rotation detection about the X-axis and rotation detection about the Y-axis and Z-axis.

In FIG. 6(A), the input device 101 is provided with a first signal processing unit 531 for executing first signal processing based on the angular velocity signal cox for the X-axis, and a second signal processing unit 533 for executing second signal processing based on the angular velocity signals ωy, ωz (and acceleration signals γy, γz) for the Y-axis and Z-axis. The first signal processing unit 531 outputs a first processed signal SGa, and the second signal processing unit 533 outputs a second processed signal SGb.

Specifically, a signal processing system for detecting rotation about the Y-axis and Z-axis, and a signal processing system for detecting rotation about the X-axis is provided in order to ensure independence between the first signal processing and the second signal processing.

For example, the first signal processing unit 531 and the second signal processing unit 533 can be implemented by first hardware and second hardware, respectively (i.e., different hardware). For example, when shared hardware is controlled by software (e.g., when a CPU is used), the first signal processing unit 531 and second signal processing unit 533 can each be implemented by preparing a signal processing routine for each signal processing unit.

In FIG. 6(B), a priority selection unit 543 is further provided. The priority selection unit 543 is provided with a priority processing determination unit E1 for determining which of any of the first signal processing and the second signal processing is to be given priority; and a selection unit E2 for selectively outputting any one of the first processed signal outputted from the first signal processing unit 531, and the second processed signal outputted from the second signal processing unit 533, based on the determination by the priority processing determination unit E1.

As the input device 101 is held in space in the hand of the user, in reality, rotation about the Y-axis and Z-axis, and rotation about the X-axis can occur simultaneously. In other words, when a user holding the main body (housing) of the input device in hand waves the distal end of the main body (housing) 100 slightly horizontally or vertically (i.e., causes slight rotation about the Y-axis and Z-axis), or rotates the main body (housing) 100 about the X-axis, rotation about the Y-axis and Z-axis, and rotation about the X-axis may occur simultaneously. As the user holds and operates the main body of the input device, some unwanted and unintentional rotation is unavoidable during actual use.

For example, when the user rotates the main body (housing) about the X-axis to scroll the display screen, rotation about the Y-axis or Z-axis occurs against the user's intention, and when this causes the cursor pointer to unexpectedly move on the display screen, the operating precision or reliability of the input device 101 is reduced.

Consequently, it is more preferred that the input device 101 be capable of determining which processing by a signal processing unit to give priority to and select an output signal when a situation occurs in which the first signal processing unit 531 and the second signal processing unit 533 are operating simultaneously in parallel fashion.

Therefore, the priority selection unit 543 is provided to the input device 101 in FIG. 6(B). The priority selection unit 543 has a priority processing determination unit E1, and a selection unit E2 for selectively outputting any one of a first processed signal outputted from the first signal processing unit, and a second processed signal outputted from the second signal processing unit, based on the determination by the priority processing determination unit. Operations not intended by the user are thereby reliably prevented, and the operating precision or reliability of the input device is prevented from decreasing.

In FIG. 6(C), a rotation compensation unit (coordinate conversion processing unit) 532 is further provided. In order to maintain independence between detection of rotation about the Y-axis and Z-axis, and detection of rotation about the X-axis, a configuration is preferably adopted whereby rotation of the main body (housing) 100 about the X-axis does not affect detection of rotation about the Y-axis and Z-axis.

For example, the gyroscopes 102, 104, 110 (angular velocity sensors) corresponding to each axis are fixed to a flat surface (e.g., inner wall surface of the housing) provided to the main body (housing) 100 of the input device 101. The Y-axis and Z-axis thereby rotate in the same manner when the main body (housing) 100 of the input device 101 rotates about the X-axis, and the position of the Y-axis gyroscope 102 or Z-axis gyroscope 104 in space also moves. There is a difference (measurement error) between the angular velocity detected by the Y-axis gyroscope 102 and the Z-axis gyroscope 104 in a state in which rotation occurs about the X-axis and the angular velocity detected in a state in which no rotation occurs.

Therefore, in FIG. 6(C), the detection error is suppressed by performing rotation compensation processing and correcting the detection signal. Specifically, as shown in FIG. 5(B), a two-dimensional YZ orthogonal coordinate system is defined by the Y-axis and Z-axis in a first plane perpendicular to the X-axis, the X-axis coinciding with the point direction of the main body (housing) 100, and a two-dimensional second orthogonal coordinate system (UV orthogonal coordinate system) is defined by a U-axis that is the horizontal axis in the first plane perpendicular to the X-axis, and a V-axis that is an axis perpendicular to the U-axis in the first plane, the X-axis coinciding with the point direction of the main body (housing) 100. The U-axis is a horizontal axis in the first plane, and the V-axis is a vertical axis orthogonal to the U-axis in the first plane. The U-axis and the V-axis are each uniquely defined by specifying the pointing direction (point direction) of the main body (housing), and are not affected by rotation of the input device about the X-axis. Through coordinate conversion (rotation coordinate conversion) from the YZ orthogonal coordinate system to the second orthogonal coordinate system (UV orthogonal coordinate system), the Y-axis angular velocity ωy detected by the Y-axis gyroscope 102, and the Z-axis angular velocity ωz detected by the Z-axis gyroscope 104 are converted to a U-axis angular velocity ωu and a V-axis angular velocity ωv, respectively. The angular velocities detected for the Y-axis and Z-axis (including the measurement error that accompanies rotation when rotation about the X-axis occurs) are thereby corrected to the correct angular velocities for a state in which there is no rotation of the main body (housing) 100 about the X-axis. Through the configuration shown in FIG. 6(C), rotation of the main body (housing) about the X-axis does not affect detection of rotation about the Y-axis and Z-axis. Consequently, through the configuration shown in FIG. 6(C), complete independence can be ensured between detection of rotation about the Y-axis and Z-axis, and detection of rotation about the X-axis. The rotation compensation processing (rotation coordinate conversion) will be described in detail hereinafter with reference to FIGS. 9 through 13.

Example of System Using Three-Dimensional Input Device for Detecting Rotation about Each of X-Axis, Y-Axis, and Z-Axis FIG. 7 is a view showing an example of the specific structure of a data processing system that utilizes a three-dimensional input device for detecting rotation about each of the X-axis, the Y-axis, and the Z-axis. The configuration shown in FIG. 6(C) is used in the input device of FIG. 7.

The input device 101 (in this instance, a three-dimensional pointing device) has a motion sensor unit (three-dimensional motion sensor unit) 502. The motion sensor unit 502 has the X-axis gyroscope 110, the Y-axis gyroscope 102, the Z-axis gyroscope 104, the Y-axis acceleration sensor 106, and the Z-axis acceleration sensor 108. The Y-axis acceleration sensor 106 and the Z-axis acceleration sensor 108 are provided for rotation compensation processing (rotation coordinate conversion).

The input device (pointing device) 101 furthermore has amplifiers 512, 514, 516, 518 and 519 for amplifying the output signals of the sensors 102, 104, 106, 108 and 110, respectively; A/D converters 520, 522, 524, 256 and 528; a conversion processing unit (e.g., CPU) 530; a comparison determination unit 540; a selection signal generation unit 541; a selector 535; a wireless transmission unit 536; and the antenna AN1.

The comparison determination unit 540 and the selection signal generation unit 541 constitute the priority processing determination unit E1 in FIG. 6(B). The selector 535 corresponds to the selection unit E2 in FIG. 6(B).

The conversion processing unit 530 has a coordinate conversion processing unit 532 and coefficient computation units (physical quantity/control quantity conversion units) 534$a$, 534$b$. The coefficient computation units (physical quantity/control quantity conversion units) 534$a$, 534$b$ may also be omitted. In this case, angular velocity signals ($\omega$u (or $\omega$y), $\omega$v (or $\omega$z), $\omega$x) after coordinate conversion are outputted.

The data processing device 600 has an antenna AN2, a receiving unit 610 (receiver), a data processing unit (e.g., CPU) 620, ROM 630, RAM 640, a display control unit 650, and a display unit 660. The display unit 660 may have a display device 662. When the display unit 660 is a projection-type display device, an image is displayed on a projection screen 400, for example.

The input device 101 shown in FIG. 7 can be used for inputting information for determining the displacement direction and displacement amount of a control object (e.g., cursor pointer CP) to the data processing device 600. The coefficient computation unit 534 provided as a physical quantity/control quantity conversion unit to the input device 101 multiplies the angular velocity signal outputted from the coordinate conversion processing unit 532 by a coefficient (conversion coefficient), and converts the angular velocity signal to a displacement amount signal (broadly speaking, a control quantity signal) for specifying the displacement amount (broadly speaking, a control quantity) of the control object (cursor pointer CP or the like), for example. Specifically, the angular velocity signals $\omega$u, $\omega$v after coordinate conversion are converted to displacement amount signals Mh, Mv, respectively (wherein Mh is the amount of displacement in the horizontal direction, and Mv is the amount of displacement in the vertical direction). The angular velocity signal $\omega$x after coordinate conversion is converted to a displacement amount Ms indicating the scroll amount of the display screen. The coordinate conversion processing will be described in detail hereinafter. It will be apparent to those skilled in the art from this disclosure that, although the angular velocity signal $\omega$x after coordinate conversion is converted to a displacement amount Ms indicating the scroll amount of the display screen in the illustrated embodiments, the angular velocity signal $\omega$x can also be used to obtain a value that corresponds to the zoom factor for zooming in or out in the display screen.

The angular velocity signals for each axis detected by the motion sensor unit 502 provided to the input device 101 can be transmitted unaltered as control signals or the like to the data processing device. However, in this case, the data processing device 600 computes the displacement amount of the control object (e.g., cursor pointer CP) in the display unit 660 based on the received angular velocity signals, and the load on the data processing device 600 is correspondingly increased. Therefore, in FIG. 7, the coefficient computation unit 534 as a physical quantity/control quantity conversion unit is provided to the input device 101, and the angular velocity signals are converted to control quantities (cursor movement amounts or display screen scroll amounts) of the control object (cursor pointer CP or display screen, for example) in the display unit 660. The obtained control quantity information (control quantity signals) Mh, Mv, Ms are each transmitted to the data processing device 600 by wireless communication (this configuration is not limiting; optical communication or wired communication may also be used). The processing load on the data processing device 600 is thereby reduced.

When the pointing direction (point direction) of the distal end of the main body (housing) is substantially straight up or straight down, the coordinate conversion processing unit 532 disables outputting of signals corresponding to the movement of the main body, or stops coordinate conversion processing and outputs the Y-axis angular velocity $\omega$y and Z-axis angular velocity $\omega$z that were in effect prior to coordinate conversion processing.

The operation of the priority selection unit (indicated by the reference numeral 543 in FIG. 6(C)) composed of the comparison determination unit 540 shown in FIG. 7, the selection signal generation unit 541, and the selector 535 will be described hereinafter.

The data processing unit 620 of the data processing device 600 performs prescribed data processing based on the signal received by the receiving unit 610, and generates data or a timing control signal for image display, for example. The display control unit 650 controls image display in the display unit 660.

In the data processing system shown in FIG. 7, the transmission unit 536 is provided to the input device, and physical quantity signals can be freely transmitted to the data processing device and other components from the input device 101 by wireless communication (including optical communication). The convenience of the input device is thereby enhanced. The input device 101 also can output signals by wired communication.

Through the present embodiment, a data processing system can be provided that utilizes a small-sized three-dimensional input device having excellent operating properties. The processing sequence of the priority selection unit (indicated by the reference numeral 543 in FIG. 6(C)) composed of the comparison determination unit 540 shown in FIG. 7, the selection signal generation unit 541, and the selector 535 will next be described.

Processing Sequence of Priority Selection Unit

FIG. 8 is a flowchart showing a control algorithm for the processing executed by the priority selection unit. The priority selection unit (indicated by reference numeral 543 in FIG.

6(C)) is composed of the comparison determination unit 540 in FIG. 7, the selection signal generation unit 541, and the selector 535. When rotation about the X-axis and rotation about the Y-axis or Z-axis occur simultaneously in parallel, the priority selection unit 543 determines which rotation is intentional by the user and selects which one type of processing to receive priority.

First, the comparison determination unit 540 in FIG. 7 acquires the angular velocity data ωx, ωy, ωz for the X-axis, Y-axis, and Z-axis, respectively (step S150).

The comparison determination unit 540 then executes a threshold value determination in order to prevent detection of noise that occurs due to slight shaking or the like of the housing (step S151).

Specifically, as shown in FIG. 8, a determination is made as to whether the absolute value of the angular velocity ωx about the X-axis is greater than a threshold value Cx for rotation about the X-axis, and only when ωx is greater than Cx, ωx is used as the signal to be processed, and the used signal is stored as J(x). When ωx is smaller than Cx, the acquired ωx is discarded.

A determination is also made as to whether the square root of the sum of the square of ωy and the square of ωz is larger than a threshold value Cyz for rotation about the Y-axis or Z-axis, and only when the square root is larger than Cyz, ωy and ωz are used as signals to be processed, and the signal of the abovementioned square root is stored as J(yz). When the square root is smaller than Cyz, the acquired ωy and ωz are discarded.

The comparison determination unit 540 then executes correction coefficient multiplication processing (step S152). Specifically, the usual angular velocity of rotation (twisting) about the X-axis of the main body (housing) 100 is several tens of degrees per second, whereas the usual angular velocity about the Y-axis or Z-axis due to slight waving of the distal end of the main body (housing) 100 in the Y-axis or Z-axis direction is several degrees per second, for example. Specifically, since the rotation amounts naturally differ in scale, direct comparison of J(x) and J(yz) always shows that J(x)>J(yz), and proper comparison processing is impossible. Therefore, J(x) is multiplied by a prescribed correction coefficient Kx to reduce the value of J(x) by a predetermined ratio, or J(yz) is multiplied by a prescribed correction coefficient Kyz to increase the value of J(yz) by a predetermined ratio.

The comparison determination unit 540 then compares KxJ(x) and KyzJ(yz) (step S153). When KxJ(x)>KyzJ(yz), the selection signal generation unit 541 shown in FIG. 7 sets a selection signal SEL to a first level, whereby the selector 535 selects and outputs the angular velocity ωx about the X-axis or a control quantity corresponding to the same (e.g., the display screen scroll amount Ms) (step S154).

When KxJ(x)<KyzJ(yz), the selection signal generation unit 541 shown in FIG. 7 sets the selection signal SEL to a second level, whereby the selector 535 selects and outputs the angular velocity ωy, ωz about the Y-axis or the Z-axis or a control quantity corresponding to the same (the horizontal displacement amount Mh or vertical displacement amount Mv) of the cursor) (step S155).

Operation that is not intended by the user is thereby reliably prevented even when rotation about the X-axis and rotation about the Y-axis or Z-axis occur simultaneously, and the operating precision or reliability of the input device 101 is prevented from decreasing.

Coordinate Conversion for Rotation Compensation

Coordinate conversion processing for rotation compensation by the coordinate conversion processing unit 532 of FIG. 7 will next be described.

FIGS. 9(A) through 9(C) are views used to describe angular velocity detection error due to rotation about the X-axis of the input device. As shown in FIG. 9(A), a state is supposed in which the right distal end of the main body (housing) 100 of the input device 101 is oriented (pointed) upward and to the right. FIG. 9(B) shows a cross-section along line S-S' in FIG. 9(A) in a state in which the main body (housing) 100 of the input device 101 is not rotated about the X-axis. FIG. 9(C) shows the cross-section along line S-S' in FIG. 9(A) in a state in which the main body (housing) 100 of the input device 101 is rotated an amount θ2 about the X-axis.

As shown in FIGS. 9(B) and 9(C), the cross-section of the internal wall surfaces of the main body (housing) 100 of the input device 101 is substantially square shaped. The four surfaces constituting the internal wall surfaces (or the edges constituting the cross-sectional shape of the internal wall surfaces) are designated P1 through P4. The two gyroscopes 102, 104 (angular velocity sensors) detect the angular velocity of rotation about the Y-axis and the Z-axis (i.e., the detection axes), respectively. The gyroscopes 102, 104 are fixed to the internal wall surfaces P3 and P2, respectively, of the main body (housing) 100 of the input device 101. Thus, as shown in FIG. 9(C), when the main body (housing) 100 of the input device 101 rotates an amount θ2 about the axis (X-axis) other than the detection axes (Y-axis, Z-axis), the Y-axis and Z-axis also rotate, and the position of each gyroscope (angular velocity sensor) varies as a result.

Consequently, even though the same movement (in this case, left and right movement QR, QL, respectively) occurs at the distal end of the main body (housing) 100 of the input device 101, a difference occurs between the angular velocity detected in a state in which there is no rotation about the X-axis (the state shown in FIG. 9(B)) and the angular velocity detected in a state in which there is rotation about the X-axis (the state shown in FIG. 9(C)). Specifically, a detection error occurs due to rotation of the main body (housing) 100 of the input device 101 about the axis (X-axis) other than the detection axes (Y-axis, Z-axis).

A configuration is therefore adopted in the present embodiment whereby the detected angular velocities (angular velocities for the Y-axis and Z-axis) are corrected (specifically, coordinate-converted) so as to be unaffected by rotation of the housing about the X-axis, and so that the correct angular velocity can always be detected. The manner in which the user holds the main body (housing) is thereby unrestricted, and the operating properties of the three-dimensional input device are improved. Information relating to the rotation angle about the X-axis is obtained in order to execute coordinate conversion, and in order to obtain this information, the input device of the present embodiment is provided with acceleration sensors for detecting acceleration about the Y-axis and acceleration about the Z-axis.

Coordinate Conversion Processing

The input device 101 is provided with the coordinate conversion processing unit 532, and the coordinate conversion processing unit 532 executes coordinate conversion processing. The coordinate conversion processing will be described using FIGS. 10 through 13.

Figure 10:
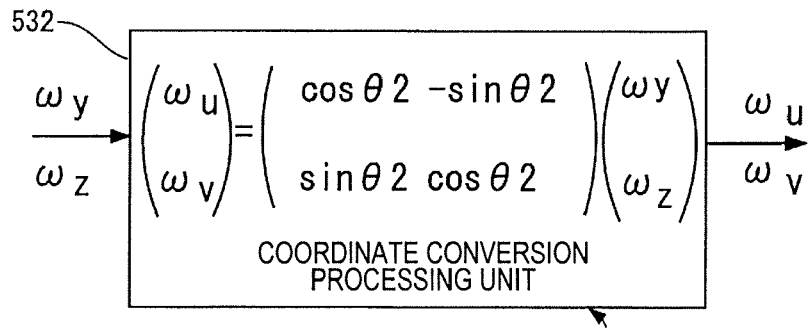
FIG. 10 is a diagram showing the details of coordinate conversion processing (rotation coordinate conversion)
Figure 11:
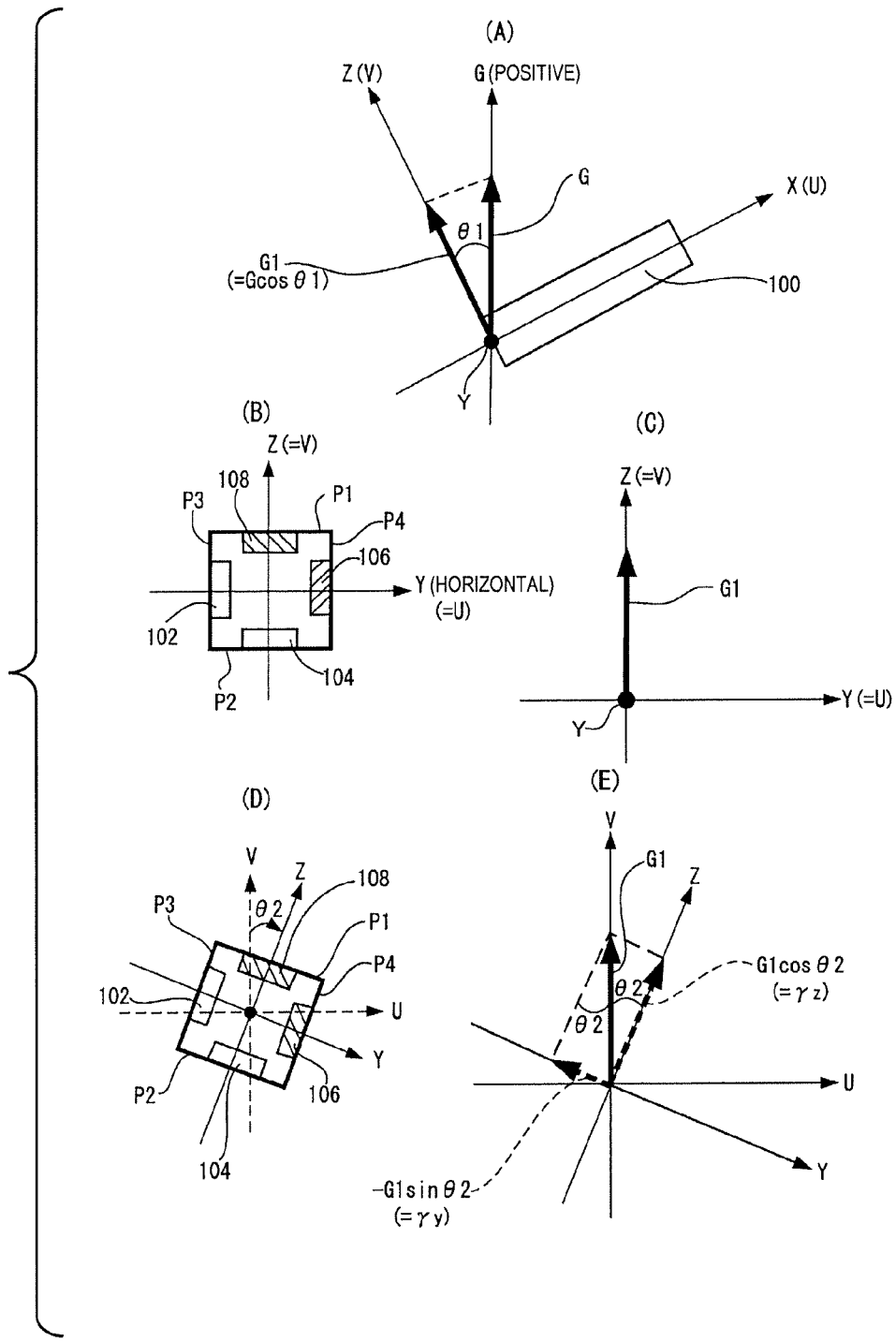
FIGS. 11(A) through 11(E) are schematic views for explaining the coordinate conversion processing.

FIG. 10 is a view showing the details of coordinate conversion (rotation coordinate conversion). FIGS. 11(A) through 11(E) and 12 are views showing the information and the like necessary for coordinate conversion. Coordinate conversion is generally performed by a combination of parallel movement and rotation. In the present embodiment, it is sufficient if only rotation about the X-axis is considered. Rotation coordinate conversion can be performed through the use of a matrix operation.

In this case, the coordinate conversion processing unit 532 converts the Y-axis angular velocity $\omega_y$ and the Z-axis angular velocity $\omega_z$ to a U-axis angular velocity $\omega_u$ and $\omega_v$, respectively, by computation according to Equation (1) and Equation (2) below, wherein $\gamma_y$ is the Y-axis acceleration, $\gamma_z$ is the Z-axis acceleration, $\omega_y$ is the Y-axis angular velocity, and $\omega_z$ is the Z-axis acceleration. The sequence is described below. When the angle formed by the Y-axis (Z-axis) and the U-axis (V-axis) in the Q-plane (see FIG. 4(A)) perpendicular to the X-axis is designated as θ2, the matrix operation according to Equation (3) below may be performed in order to convert the Y-axis angular velocity $\omega_y$ and the Z-axis angular velocity $\omega_z$ to the U-axis angular velocity $\omega_u$ and $\omega_v$, respectively. Equation (4) and Equation (5) below are thus established.

Equations (1) to (5)

$$\omega_u = \frac{\omega_y \gamma_z - \omega_z \gamma_y}{\sqrt{\gamma_y^2 + \gamma_z^2}} \quad (1)$$

$$\omega_v = \frac{\omega_y \gamma_y + \omega_z \gamma_z}{\sqrt{\gamma_y^2 + \gamma_z^2}} \quad (2)$$

$$\begin{pmatrix} \omega_u \\ \omega_v \end{pmatrix} = \begin{pmatrix} \cos\theta 2 & -\sin\theta 2 \\ \sin\theta 2 & \cos\theta 2 \end{pmatrix} \begin{pmatrix} \omega_y \\ \omega_z \end{pmatrix} \quad (3)$$

$$\omega_u = \omega_y \cos\theta 2 - \omega_z \sin\theta 2 \quad (4)$$

$$\omega_v = \omega_y \sin\theta 2 + \omega_z \cos\theta 2 \quad (5)$$

The coordinate conversion processing unit 532 shown in FIG. 10 executes the computations shown in Equations (4) and (5) above. The Y-axis acceleration sensor 106 and the Z-axis acceleration sensor 108 are provided in order to determine sin θ2 and cos θ2 for executing the computations shown in Equations (4) and (5) above.

Gravitational acceleration will be described with reference to FIGS. 11(A) through 11(E). As shown in FIG. 11(A), gravitational acceleration (in the direction straight upward) is designated as G. Specifically, in a weightless state (e.g., in a state in which an object is placed in outer space or the like), the output of an acceleration sensor is zero. In the same manner, since a weightless state occurs inside an object in free fall, the output of an acceleration sensor is zero. On the other hand, an object in free fall on Earth is accelerating downward at 1G (−1G upward). The following relationship is also established: (Acceleration sensor output)=(Acceleration state of the object)−(1G downward). Consequently, when the object is static, the output of the acceleration sensor is equal to 0−(1G downward)=(1G upward). When the angle θ1 is formed by the vertical axis (G-axis) and the first plane, the component of the gravitational acceleration (straight upward) G that is in the V-axis (which coincides with the Z-axis in a state in which there is no rotation about the X-axis), which is the perpendicular axis in the first plane, is designated as G1 (=G cos θ1).

As shown in FIG. 11(B), the Y-axis acceleration sensor 106 is provided to the internal wall surface P4 of the main body (housing) 100, and the Z-axis acceleration sensor 108 is provided to the internal wall surface P1 of the main body (housing) 100. FIG. 11(B) shows a state in which there is no rotation about the X-axis of the main body (housing) 100. FIG. 11(C) shows the components of the vector G1 for each coordinate axis, and corresponds to FIG. 11(B). A case is assumed herein in which the main body (housing) 100 of the input device 101 is rotated an amount θ2 about the X-axis.

FIG. 11(D) shows a state in which the main body (housing) 100 is rotated (rotation angle θ2) about the X-axis. FIG. 11(E) shows the components of the vector G1 for each coordinate axis, and corresponds to FIG. 11(D). In FIG. 11(E), the vector G1 can be decomposed into a Z-axis component and a Y-axis component (both of which are indicated by thick dashed lines in the drawing). Specifically, the Z-axis component of the gravitational acceleration G (i.e., the Z-axis acceleration $\gamma_z$) is G1 cos θ2, and in the same manner, the Y-axis component of the gravitational acceleration G (straight upward) (i.e., the Y-axis acceleration $\gamma_y$) is G1 sin θ2. As is apparent, the Y-axis acceleration $\gamma_y$ and the Z-axis acceleration $\gamma_z$ include the information of the rotation angle θ2 about the X-axis. Consequently, the computations according to Equations (4) and (5) above can be executed by detecting the Z-axis acceleration $\gamma_z$ and the Y-axis acceleration $\gamma_y$. Specifically, Equations (4) and (5) can be transformed into Equations (6) and (7), respectively. Moreover, G1 can be indicated as shown in Equation (8) below.

Equations (6) to (8)

$$\omega_u = \frac{\omega_y G1\cos\theta 2 - \omega_z G1\sin\theta 2}{G1} \quad (6)$$

$$\omega_v = \frac{\omega_y G1\sin\theta 2 + \omega_z G1\cos\theta 2}{G1} \quad (7)$$

$$G1 = \sqrt{G1^2(\sin^2\theta + \cos^2\theta)} = \sqrt{\gamma_y^2 + \gamma_z^2} \quad (8)$$

By substituting Equation (8) into the denominators of Equations (6) and (7), and setting $\gamma_y$=G1 sin θ2 and $\gamma_z$y=G1 cos θ2 in Equations (6) and (7), Equations (1) and (2) above can be obtained. Specifically, the coordinate conversion processing unit 532 can convert the Y-axis angular velocity $\omega_y$ and the Z-axis angular velocity $\omega_z$ to the U-axis angular velocity $\omega_u$ and $\omega_v$, respectively, by executing the computations according to Equations (1) and (2).

Figure 12:
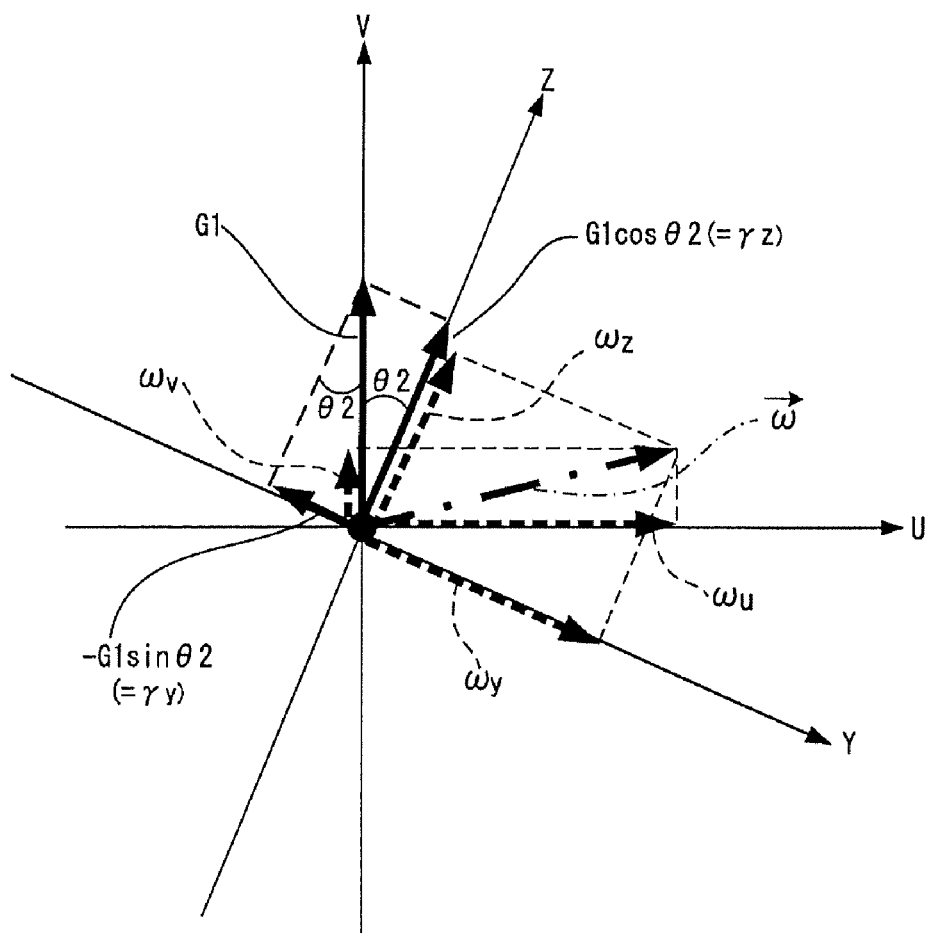
FIG. 12 is a schematic view for explaining the coordinate conversion processing.

FIG. 12 is a view showing the interrelationships of ωy, ωz, ωu, ωv, γy, and γz. As described above, the Y-axis angular velocity ωy and the Z-axis angular velocity ωz are detected by the Y-axis gyroscope 102 and the Z-axis gyroscope 104, respectively. The Y-axis acceleration γy and the Z-axis acceleration γz are detected by the Y-axis acceleration sensor 106 and the Z-axis acceleration sensor 108, respectively. The U-axis angular velocity ωu and the V-axis angular velocity ωv are calculated by the coordinate conversion described above.

Measures Taken when Point Direction is Substantially Straight Upward or Substantially Straight Downward When the main body (housing) 100 of the input device 101 is oriented substantially straight upward or substantially straight downward, the angle θ1 between the vertical axis (G-axis) and the Q-plane (see FIG. 4(A)) is substantially 90°. Consequently, the component of the gravitational acceleration (straight upward) G that is in the V-axis, which is the perpendicular axis in the Q-plane perpendicular to the X-axis, is cos 90=0, and is therefore substantially 0. The Y-axis acceleration ($\gamma_y$=G1 sin θ2) and the Z-axis acceleration ($\gamma_z$=G1 cos θ2) are thus also substantially 0. The denominators in Equations (1) and (2) above are thus substantially 0, and computation for coordinate conversion is impossible.

In reality, since the pointing direction (point direction) of the main body (housing) is toward the display screen or screen, and is very substantially horizontal, there may be no problem, but because the pointing direction of the main body (housing) 100 of the input device 101 may be substantially straight upward or straight downward in rare cases, several measures are preferably put in place.

For example, when the pointing direction (point direction) of the distal end of the main body (housing) 100 is substantially straight up or straight down, a method is employed for keeping the signal output from the input device 101 at zero (i.e., disabling the output of signals corresponding to the movement of the main body). The processing load (load that accompanies response processing) in the data processing device (the side that receives signals from the input device 101) is thereby reduced.

For example, when the pointing direction of the main body (housing) 100 is substantially straight upward or substantially straight downward, coordinate conversion processing by the coordinate conversion processing unit 532 is stopped, and the Y-axis angular velocity signal and Z-axis angular velocity signal prior to coordinate conversion processing may each be outputted directly. In this case, an advantage is gained in that the data processing device (the side that receives signals from the input device 101) can control the position of a control object (e.g., a cursor pointer) in the display unit, for example, based on the received Y-axis angular velocity signal and Z-axis angular velocity signal.

A substantially straight up or straight down orientation of the pointing direction (point direction) of the distal end of the main body (housing) 100 can be detected by comparing the denominators of Equations (1) and (2) above to a predetermined threshold value, for example. Specifically, the point direction can be determined to be substantially straight up or substantially straight down when the denominator is smaller than the threshold value.

FIG. 13 is a flow diagram showing a control algorithm for the coordinate conversion processing for rotation compensation. The coordinate conversion processing unit 532 provided to the input device 101 acquires acceleration data γy, γz (step S700) and acquires angular velocity data ωy, ωz (step S701).

Then, γyωy-γyωz gives Su (step S702), γyωy+γzωz gives Sv (step S703), the denominators of Equations (1) and (2) above give k (step S704), and kSu gives ωu and kSv gives ωv (step S705). The angular velocity ωu of rotation about the U-axis, and the angular velocity ωv of rotation about the V-axis are thereby obtained.

The physical quantity/displacement amount conversion unit (coefficient computation unit) 534 then multiplies ωv by the coefficient βyv to compute a horizontal displacement amount MH (step S706), multiplies ωu by the coefficient βzu to compute a vertical displacement amount MH (step S707), and computes Mh, My by integer conversion processing (step S708).

When the point direction of the main body (housing) 100 of the input device 101 is substantially straight up or substantially straight down, the horizontal displacement amount and the vertical displacement amount are both 0. Thus, when Mh=0 and Mv=0, no signal is outputted from the input device 101, and processing is ended (step S709), and a horizontal displacement amount Mh and vertical displacement amount Mv are transmitted to the data processing device 600 (step S710) only when a determination of "No" has been made in step S709.

Second Embodiment

Figure 16:
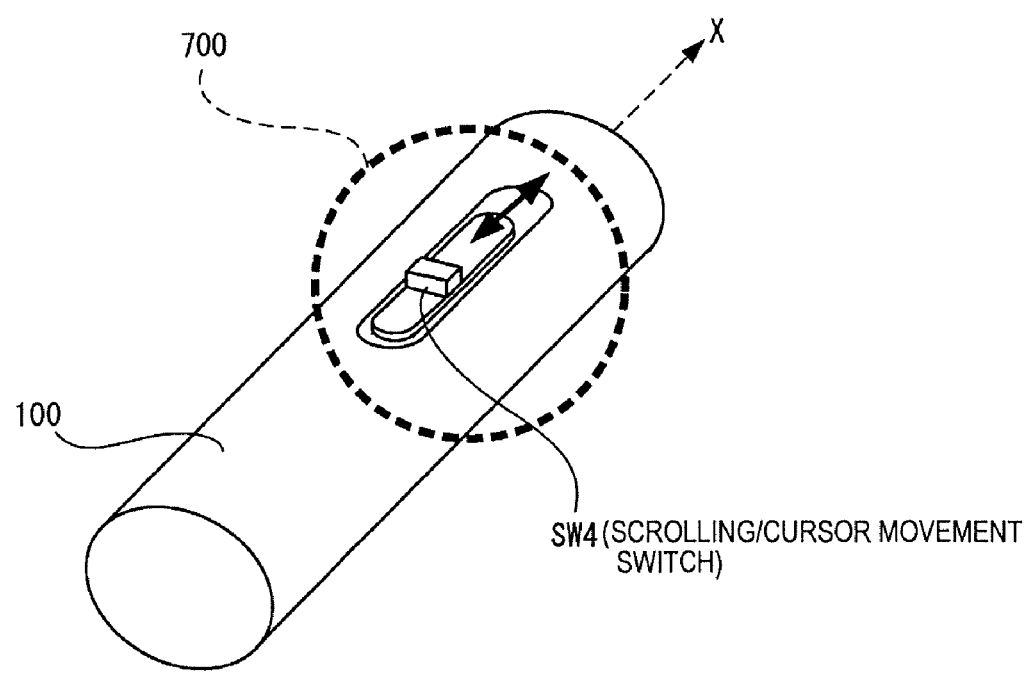
FIG. 16 is a schematic view showing an example of the external structure of yet another example (in which a switch is provided) of an input device for detecting rotation about the X-axis, rotation about the Y-axis, and rotation about the Z-axis.

FIGS. 14 through 16 are views showing examples of the external structure of other examples (in which an enable switch or the like is provided) of an input device for detecting rotation about the X-axis, rotation about the Y-axis, and rotation about the Z-axis.

In FIG. 14, the main body (housing) 100 of the input device 101 is provided with an operating unit 700 having an output enable switch SW1 (e.g., a press-type or slide-type switch) for switching between enabling and disabling signal output.

In this instance, a case is assumed in which the input device 101 has a cursor pointer movement control function (first control input function) and a display screen scrolling function (second control input function). The output enable switch SW1 shown in FIG. 14 is a shared output enable switch for controlling the enabling/disabling of each function in common. Since the output enable switch SW1 can be operated independently of the orientation of the main body (housing) 100 in space, the output enable switch SW1 is easy for the user to operate.

Since the output enable switch SW1 is provided, signals are outputted from the input device 101 only when the user is operating the operating unit 700 (e.g., only when the user is pressing the output enable switch SW1). Consequently, during periods in which the operating unit 700 is not being operated (e.g., periods in which the output enable switch SW1 is not pressed), even when the main body (housing) 100 is moved, there is no positional displacement or the like of the control object (e.g., cursor pointer), for example. Through the input device 101 shown in FIG. 14, movement of the control object not intended by the user can be reliably prevented, and the convenience of the input device is further enhanced.

Various types of variations are possible in the configuration of the operating unit 700. In FIG. 15, output enable switches SW2, SW3 are provided that respectively correspond to the abovementioned two functions of the input device 101. In this case, the user can selectively activate any of the cursor movement control function and the display screen scrolling control function, and convenience to the user is enhanced.

In FIG. 16, a switch SW4 is provided in the operating unit 700. For example, the input device has a cursor pointer movement control function (first control function) and a display screen scrolling function (second control function), but the user may sometimes wish to utilize only the first control function. Therefore, in FIG. 16, a switch (scrolling/cursor movement switch) SW4 for switching between functions (types of signal processing) is provided to the operating unit 700 of the main body (housing) 100 so that any one function can be selected from among the plurality of functions of the input device 101. The user can thereby selectively utilize a single desired function from among the plurality of functions of the input device 101. Convenience to the user is therefore further enhanced.

Figure 17:
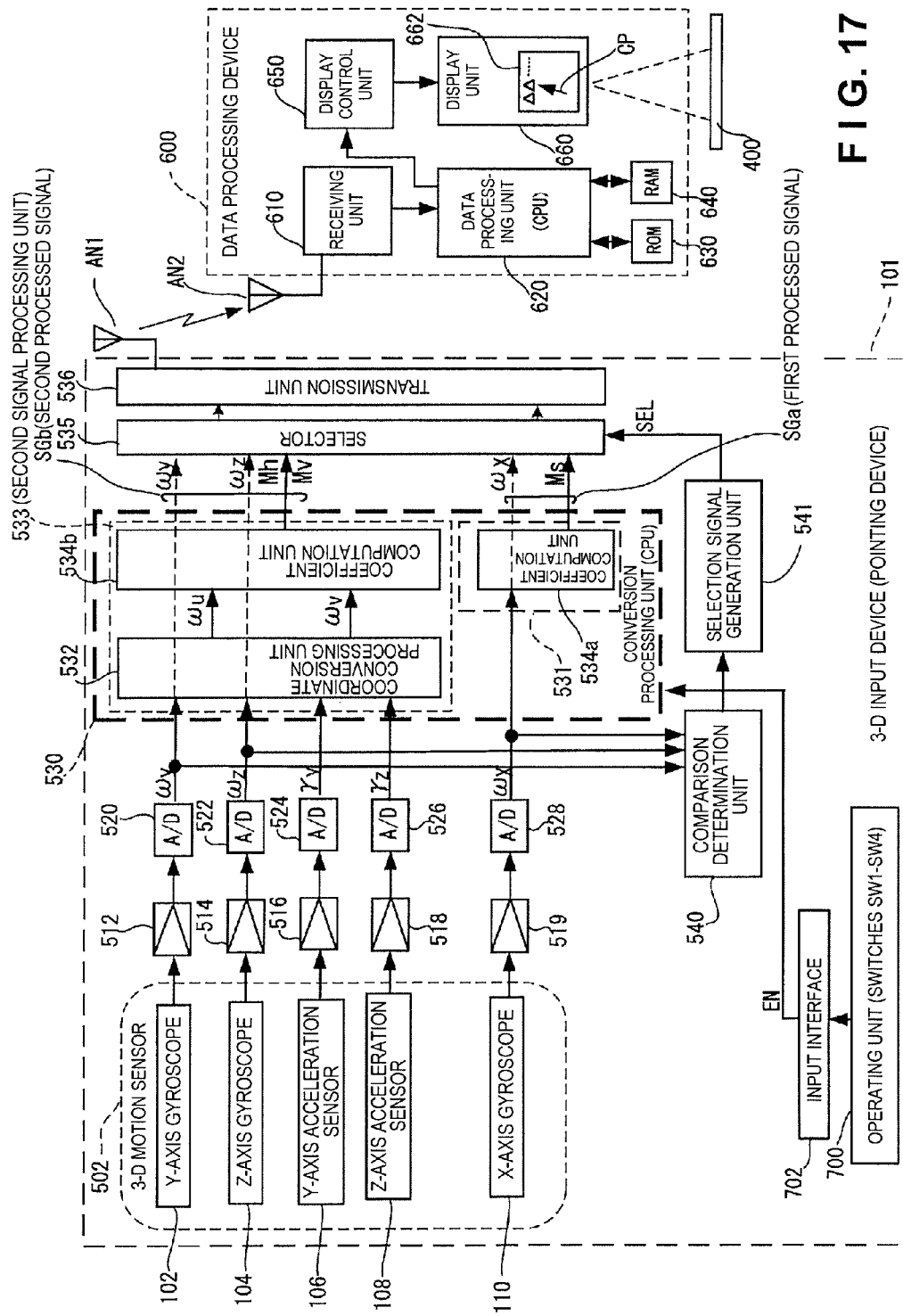
FIG. 17 is a block diagram showing an example of the internal structure of another example (in which a function switch is provided) of an input device for detecting rotation about the X-axis, rotation about the Y-axis, and rotation about the Z-axis.

FIG. 17 is a view showing the internal structure of another example (in which an enable switch or the like is provided) of an input device for detecting rotation about the X-axis, rotation about the Y-axis, and rotation about the Z-axis.

In the input device 101 shown in FIG. 17, the operating unit 700 (having at least one of the switches SW1 through SW4 shown in FIGS. 14 through 16) and an input interface 702 are added to the configuration shown in FIG. 7. The operating unit 700 functions as a mode switch for switching a mode of signal output from the input device 101.

Buttons or the like having the same function as the left/right click buttons of a mouse may also be added to the configuration shown in FIG. 17 in order to provide functionality equivalent to that of a mouse, for example. In this case, the convenience of the input device 101 can be further enhanced.

As described above, according to at least one embodiment of the present invention, an input device can be provided that is capable of simple scrolling and the like of a display screen. It is also possible to easily add functionality for moving a cursor pointer vertically and horizontally, and functionality for scrolling and the like of the display screen, for example. A pointing device having similar operating properties to a mouse, for example, or a convenient, multi-function pointing device that has similar operating properties to a pointing rod or laser pointer can therefore be provided that is capable of easy scrolling and the like of a display screen.

The input device of the present embodiment is particularly useful in presentation or other settings in which a mouse, pointing rod, laser pointer, or the like has conventionally been used, but the utilization of the input device of the present embodiment is not limited to such settings. When the input device is used as an input device of a computer or the like, i.e., as a user interface, for example, the input device can be used for input in all the applications operated by the input device. The input device of the present invention can also be applied in a panning system for a remotely operated camera, a robotic control system, or various other systems. The input device of the present embodiment can also be applied in any device or system equipped with an application program whereby information can be inputted by a mouse scroll wheel or the like. There has never been a conventional example of operation by rotating (turning, twisting) a main body (housing) about the point direction. The input device of the present embodiment is a multifunction input device that is provided with an entirely novel user interface, and more applications thereof are anticipated.

Embodiments of the present invention are described in detail above, but it will be readily apparent to one skilled in the art that numerous modifications of the present invention are possible in a range that does not depart from the new matter and effects of the present invention. All such modifications are accordingly encompassed by the present invention. The term "input device" is interpreted in the broadest sense, and broadly encompasses input devices that are capable of inputting signals that correspond to spatial displacement. The configuration of the three-dimensional motion sensor is not limited by the embodiments described above, and other configurations may be adopted (for example, a configuration in which a magnetic sensor or the like is included in addition to a gyroscope and an acceleration sensor). The orientation and rotation of the input device, as well as translation of the input device are also included in spatial displacement. Translation (horizontal movement, vertical movement, or other movement) of the input device can be computed by integrating the variation of the output of an acceleration sensor over time.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An input device comprising:
   a main body having a longitudinal axis;
   a motion sensor unit configured and arranged to detect rotation of the main body about the longitudinal axis, the motion sensor unit having an X-axis angular velocity sensor configured and arranged to detect an angular velocity of the main body about an X-axis in a three-dimensional orthogonal coordinate system defined by the X-axis, a Y-axis and a Z-axis, the X-axis coinciding with the longitudinal axis of the main body and the Y-axis and the Z-axis being orthogonal to each other in a first plane perpendicular to the X-axis, a Y-axis angular velocity sensor configured and arranged to detect an angular velocity of the main body about the Y-axis, and a Z-axis angular velocity sensor configured and arranged to detect an angular velocity of the main body about the Z-axis;
   a first signal processing unit configured to execute first signal processing based on an X-axis angular velocity signal received from the X-axis angular velocity sensor; and
   a second signal processing unit configured to execute second signal processing based on a Y-axis angular velocity signal received from the Y-axis angular velocity sensor and a Z-axis angular velocity signal received from the Z-axis angular velocity sensor, the second signal processing being executed independently of the first signal processing.

2. The input device according to claim 1, further comprising
   a physical quantity/control quantity conversion unit configured to convert a physical quantity signal outputted from the motion sensor unit to a control quantity signal indicative of a control quantity for controlling a control object.

3. The input device according to claim 1, further comprising
   a priority selection unit including
      a priority processing determination unit configured to determine which one of the first signal processing and the second signal processing is to be given priority, and
      a selection unit configured to selectively output one of a first processed signal outputted from the first signal processing unit and a second processed signal outputted from the second signal processing unit based on determination by the priority processing determination unit.

4. The input device according to claim 3, further comprising
an operating unit including a switch configured and arranged to forcibly switch between executing the first signal processing by the first signal processing unit and executing the second signal processing by the second signal processing unit.

5. The input device according to claim 3, wherein
the first signal processing unit is configured to execute the first signal processing to output a first processed signal corresponding to a control quantity signal indicative of at least one of a scroll amount of a display screen and a zoom factor of a display image, and
the second signal processing unit is configured to execute the second signal processing to output a second processed signal corresponding to a control quantity signal relating to displacement of a cursor pointer on the display screen.

6. The input device according to claim 1, wherein
the motion sensor unit further includes
a Y-axis acceleration sensor configured and arranged to detect an acceleration of the main body in a Y-axis direction, and
a Z-axis acceleration sensor configured and arranged to detect an acceleration of the main body in a Z-axis direction,
the second signal processing unit further includes
a coordinate conversion processing unit configured to perform coordinate conversion processing in which the Y-axis angular velocity detected by the Y-axis angular velocity sensor and the Z-axis angular velocity detected by the Z-axis angular velocity sensor are converted to a U-axis angular velocity and a V-axis angular velocity, respectively, in a two-dimensional orthogonal coordinate system defined by a U-axis that is a horizontal axis in the first plane perpendicular to the X-axis and a V-axis that is perpendicular to the U-axis in the first plane, the coordinate conversion processing unit being configured to perform the coordinate conversion processing based on the acceleration detected by the Y-axis acceleration sensor and the acceleration detected by the Z-axis acceleration sensor.

7. The input device according to claim 1, further comprising
an operating unit including an output enable switch configured and arranged to switch between enabling and disabling signal output from the input device.

8. A data processing system comprising:
the input device according to claim 1; and
a data processing device configured and arranged to receive a transmission signal from the input device and to execute prescribed data processing based on the signal received from the input device.

* * * * *